US012592189B2

(12) United States Patent
Byun et al.

(10) Patent No.: US 12,592,189 B2
(45) Date of Patent: Mar. 31, 2026

(54) DISPLAY DEVICE

(71) Applicant: Samsung Display Co., LTD., Yongin-si (KR)

(72) Inventors: Min Woo Byun, Yongin-si (KR); Min Joo Kim, Yongin-si (KR); Seon I Jeong, Yongin-si (KR); Chae Han Hyun, Yongin-si (KR); Sung Chan Hwang, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/377,769

(22) Filed: Oct. 7, 2023

(65) Prior Publication Data

US 2024/0135876 A1 Apr. 25, 2024
US 2024/0233639 A9 Jul. 11, 2024

(30) Foreign Application Priority Data

Oct. 25, 2022 (KR) ........................ 10-2022-0138467
Mar. 23, 2023 (KR) ........................ 10-2023-0038177

(51) Int. Cl.
*G09G 3/32* (2016.01)
*G09G 3/3233* (2016.01)

(52) U.S. Cl.
CPC ... *G09G 3/3233* (2013.01); *G09G 2300/0819* (2013.01); *G09G 2300/0852* (2013.01); *G09G 2300/0861* (2013.01); *G09G 2310/0202* (2013.01); *G09G 2310/067* (2013.01); *G09G 2310/08* (2013.01)

(58) Field of Classification Search
CPC ......... G09G 3/3233; G09G 2300/0819; G09G 2300/0852; G09G 2300/0861; G09G 2310/0202; G09G 2310/067; G09G 2310/08
See application file for complete search history.

(56) References Cited

U.S. PATENT DOCUMENTS 11,127,272 B2 9/2021 Park et al.
11,127,330 B1 9/2021 Shen et al.
2018/0061316 A1* 3/2018 Shin ..................... G09G 3/3275
2019/0206966 A1* 7/2019 Kim ................... H10K 59/1213
2021/0027701 A1* 1/2021 Park ..................... G09G 3/3233
(Continued)

FOREIGN PATENT DOCUMENTS

KR 102442058 B1 9/2022

*Primary Examiner* — Lisa S Landis
(74) *Attorney, Agent, or Firm* — CANTOR COLBURN LLP

(57) ABSTRACT

A display device includes a display panel including pixels in one pixel column and a gate driver for sequentially providing scan signals to the pixels. Each of the pixels includes a light emitting element, a first transistor for controlling a current amount of driving current flowing through the light emitting element and a second transistor for transferring a data signal to a gate electrode of the first transistor in response to a corresponding scan signal among the scan signals. A first pixel among the pixels is electrically connected to a first data line, and a second pixel adjacent to the first pixel among the pixels is electrically connected to a second data line different from the first data line. A second scan signal provided to the second pixel partially overlaps with a first scan signal provided to the first pixel.

12 Claims, 16 Drawing Sheets

(56) References Cited

U.S. PATENT DOCUMENTS

| | | | | |
|---|---|---|---|---|
| 2021/0118368 | A1* | 4/2021 | In ........................ | G09G 3/3275 |
| 2021/0210014 | A1* | 7/2021 | Kim .................... | G09G 3/2007 |
| 2022/0335888 | A1 | 10/2022 | Song | |
| 2022/0343857 | A1 | 10/2022 | Choi et al. | |

* cited by examiner

GL: EBL, ECL, SL1, SL2, SL3

GL: EBL, ECL, SL1, SL2, SL3

GL: EBL, ECL, SL1, SL2, SL3

DISPLAY DEVICE

This application claims priority to Korean Patent Application No. 10-2022-0138467, filed on Oct. 25, 2022, and Korean Patent Application No. 10-2023-0038177, filed on Mar. 23, 2023, and all the benefits accruing therefrom under 35 U.S.C. § 119, the entire contents of which in their entirety are herein incorporated by reference.

BACKGROUND

1. Field

The present disclosure generally relates to a display device.

2. Description of the Related Art

A display device includes pixels, and sequentially scans the pixels by using scan signals. A data signal is written in a pixel scanned in response to a corresponding scan signal among the scan signals, and the pixel emits light with a luminance corresponding to the data signal.

A first horizontal time for which the scan signals are sequentially applied to the pixels may be decreased according to high resolution and high-frequency driving of the display device, and a time for which a data signal can be written in each of the pixels may become insufficient within the first horizontal time.

SUMMARY

Embodiments provide a display device capable of performing high-frequency driving.

In accordance with an aspect, there is provided a display device including a display panel including pixels in one pixel column and a gate driver configured to sequentially provide scan signals to the pixels, wherein each of the pixels includes a light emitting element, a first transistor configured to control a current amount of driving current flowing through the light emitting element and a second transistor configured to transfer a data signal to a gate electrode of the first transistor in response to a corresponding scan signal among the scan signals, wherein a first pixel among the pixels is electrically connected to a first data line, and a second pixel adjacent to the first pixel among the pixels is electrically connected to a second data line different from the first data line, and wherein a second scan signal provided to the second pixel partially overlaps with a first scan signal provided to the first pixel.

In an embodiment, the gate driver may sequentially provide the scan signals to the pixels at an interval of one horizontal time. A pulse width of the second scan signal may be greater than the one horizontal time.

In an embodiment, the pulse width of the second scan signal may be about three horizontal times.

In an embodiment, the pulse width of the second scan signal may be about two horizontal times.

In an embodiment, in a period in which the second scan signal does not overlap with the first scan signal, the data signal for the second pixel may be applied to the second data line.

In an embodiment, each of the pixels may further include a third transistor electrically connected between a reference power line and the gate electrode of the first transistor, a fifth transistor electrically connected between a first power line and a first electrode of the first transistor, a first capacitor electrically connected between the gate electrode and a second electrode of the first transistor and a second capacitor electrically connected between the second electrode of the first transistor and the first power line.

In an embodiment, the first transistor may further include a second gate electrode electrically connected to the second electrode of the first transistor.

In an embodiment, each of the pixels may further include a fourth transistor electrically connected between an anode electrode of the light emitting element and a second initialization power line, a sixth transistor electrically connected between the second electrode of the first transistor and the anode electrode of the light emitting element and a seventh transistor electrically connected between the second electrode of the first transistor and a first initialization power line.

In an embodiment, each of the pixels may further include a fourth transistor electrically connected between the second electrode of the first transistor and a first initialization power line.

In an embodiment, each of the pixels may further include a fourth transistor electrically connected between an anode electrode of the light emitting element and a second initialization power line and a sixth transistor electrically connected between the second electrode of the first transistor and the anode electrode of the light emitting element.

In an embodiment, each of the pixels may further include a third transistor electrically connected between a reference power line and the gate electrode of the first transistor, a fourth transistor electrically connected between an anode electrode of the light emitting element and a second initialization power line, a fifth transistor electrically connected between a first power line and a first electrode of the first transistor, a sixth transistor electrically connected between a second electrode of the first transistor and the anode electrode of the light emitting element, a seventh transistor electrically connected between the second electrode of the first transistor and a third power line, a first capacitor electrically connected between the gate electrode and the second electrode of the first transistor and a second capacitor electrically connected between the second electrode of the first transistor and the seventh transistor.

In an embodiment, each of the first transistor and the second transistor may include an oxide semiconductor.

In an embodiment, odd-numbered pixels among the pixels may be electrically connected to the first data line, and/or even-numbered pixels among the pixels may be electrically connected to the second data line.

In accordance with another aspect, there is provided a display device including a display panel including pixels in one pixel column and a gate driver configured to sequentially provide scan signals to the pixels at an interval of one horizontal time, wherein each of the pixels includes a light emitting element, a first transistor configured to control a current amount of driving current flowing through the light emitting element and a second transistor configured to transfer a data signal to a gate electrode of the first transistor in response to a corresponding scan signal among the scan signals, wherein a first pixel among the pixels is electrically connected to a first data line, and a second pixel adjacent to the first pixel among the pixels is electrically connected to a second data line different from the first data line, and wherein a pulse width of each of the scan signals is greater than or equal to two horizontal times.

In an embodiment, the pulse width of each of the scan signals may be about three horizontal times.

BRIEF DESCRIPTION OF THE DRAWINGS

Example embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the example embodiments to those skilled in the art.

DETAILED DESCRIPTION

Figure 1:
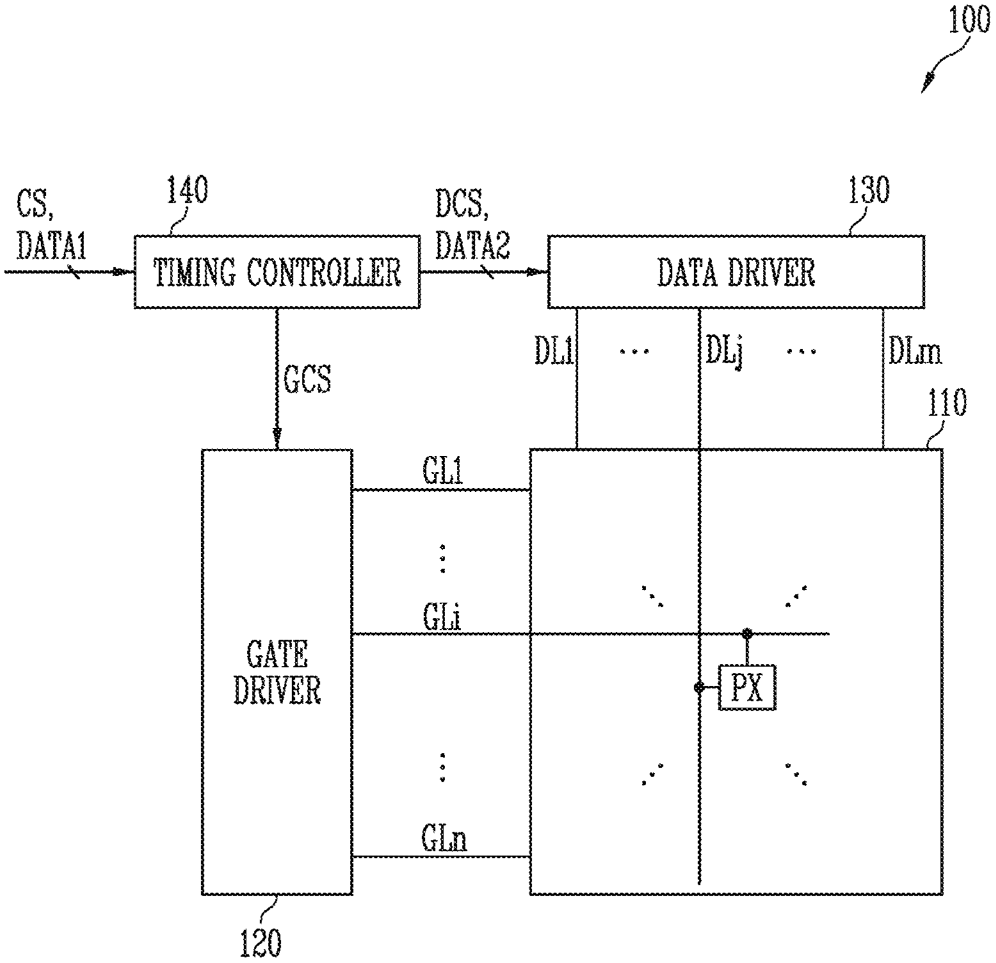
FIG. 1 is a schematic block diagram illustrating a display device, in accordance with an embodiment.

Hereinafter, embodiments are described in detail with reference to the accompanying drawings so that those skilled in the art may easily practice the invention. The invention may be implemented in various different forms and is not limited to the exemplary embodiments described in the specification.

Some embodiments are described in the accompanying drawings in relation to functional blocks, units, and/or modules. Those skilled in the art will understand that these functional blocks, units, and/or modules are physically implemented by logic circuits, individual components, microprocessors, hard wire circuits, memory elements, line connection, and other electronic circuits. This may be formed by using semiconductor-based manufacturing techniques or other manufacturing techniques. In the case of functional blocks, units, and/or modules implemented by microprocessors or other similar hardware, the functional blocks, units, and/or modules are programmed and controlled by using software, to perform various functions discussed in the disclosure, and may be selectively driven by firmware and/or software.

In addition, each functional block, each unit, and/or each module may be implemented by dedicated hardware or by a combination dedicated hardware to perform some functions of the functional block, the unit, and/or the module and a processor (e.g., one or more programmed microprocessors and associated circuitry) to perform other functions of the functional block, the unit, and/or the module. In some embodiments, the functional blocks, the units, and/or the modules may be physically separated into two or more individual functional blocks, two or more individual units, and/or two or more individual modules without departing from the scope of the disclosure. Also, in some embodiments, the functional blocks, the units, and/or the modules may be physically separated into more complex functional blocks, more complex units, and/or more complex modules without departing from the scope of the disclosure.

The term "connection" between two components may include both electrical connection and/or physical connection, but the disclosure is not necessarily limited thereto. For example, the term "connection" used based on circuit diagrams may mean electrical connection, and the term "connection" may mean physical connection.

It will be understood that, although the terms "first," "second," etc. may be used herein to describe various elements, these elements should not be limited by these terms. These terms are only used to distinguish one element from another element. Thus, a "first" element discussed below could also be termed a "second" element without departing from the teachings of the disclosure.

Meanwhile, the disclosure is not limited to embodiments disclosed herein, and may be implemented in various forms. Each embodiment disclosed herein may be independently embodied and/or be combined with another embodiment prior to being embodied.

In the drawing figures, dimensions may be exaggerated for clarity of illustration. It will be understood that when an element is referred to as being "between" two elements, it can be the only element between the two elements, or one or more intervening elements may also be present.

In the following embodiments and the attached drawings, elements not directly related to the disclosure are omitted from depiction, and dimensional relationships among individual elements in the attached drawings are illustrated only for ease of understanding but not to limit the actual scale. It should be noted that in giving reference numerals to elements of each drawing, like reference numerals refer to like elements even though like elements are shown in different drawings.

FIG. 1 is a block diagram illustrating a display device in accordance with an embodiment.

In an embodiment, the display device 100 is an electronic device in which a display surface is applied to at least one surface thereof, such as a smartphone, a television, a tablet personal computer (PC), a mobile phone, a video phone, an electronic book reader, a desktop PC, a laptop PC, a netbook computer, a workstation, a server, a personal digital assistant (PDA), a portable multimedia player (PMP), an MP3 player, a medical device, a camera, and/or a wearable device.

In an embodiment and referring to FIG. 1, the display device 100 may include a display panel 110, a gate driver 120 (or scan driver), a data driver 130 (or source driver), and a timing controller 140 (or processor).

In an embodiment, the display device 100 may be implemented as an organic light emitting display device including an organic light emitting element. However, the display device 100 is not limited thereto. For example, the display device 100 may be implemented as an inorganic light emitting display device including an inorganic light emitting element (e.g., an inorganic light emitting element having a size of nanometer scale to micrometer scale), a liquid crystal display device (LCD), an electrophoretic display (EPD), and/or the like. Also, the display device 100 may be implemented as a flexible display device, a rollable display device, a curved display device, a transparent display device, a mirror display device, and/or the like.

In an embodiment, the display panel 110 may display an image. The display panel 110 may include gate lines GL1 to GLn (n is a positive integer greater than 1), data lines DL1 to DLm (m is a positive integer greater than 1), and pixel PX.

In an embodiment, the pixels PX may be disposed in areas (e.g., pixel areas) partitioned by the gate lines GL1 to GLn and the data lines DL1 to DLm.

In an embodiment, the pixels PX may be connected to the gate lines GL1 to GLn and the data lines DL1 to DLm. For example, a pixel PX disposed on an ith pixel row and a jth pixel column may be connected to an ith gate line GLi and a jth data line DLj. Here, i may be a positive integer smaller than or equal to n, and j may be a positive integer smaller than or equal to m.

In an embodiment, the pixel PX may emit light with a luminance corresponding to a data signal provided through a corresponding data line among the data lines DL1 to DLm in response to a gate signal provided through a corresponding gate line among the gate lines GL1 to GLn.

In an embodiment, various power voltages may be provided to the display panel 110. For example, the power voltages may be provided to the display panel 110 from a power supply such as a Power Management Integrated Circuit (PMIC). The power voltages may be driving voltages necessary for operation of the pixel PX. The power voltages will be described later with reference to FIG. 2.

In an embodiment, the gate driver 120 may generate a gate signal (e.g., a gate signal having a turn-on voltage level at which a transistor is turned on), based on a gate control signal GCS (or scan control signal), and/or sequentially provide the gate signal to the gate lines GL1 to GLn. The gate control signal GCS may include a start signal, a clock signal, and/or the like, and/or be provided from the timing controller 140. For example, the gate driver 120 may include a shift register (and/or stage) which may sequentially output a gate signal in a pulse form, which corresponds to the start signal, using the clock signal.

In an embodiment, the data driver 130 may generate data signals, based on image data DATA2 and/or a data control signal DCS, which may be provided from the timing controller 140, and provide the data signals to the display panel 110 (or the pixels PX). The data control signal DCS may be a signal for controlling an operation of the data driver 130, and may include a horizontal start signal, a data clock signal, and/or the like. For example, the data driver 130 may include a shift register which generates a sampling signal by shifting the horizontal start signal in synchronization with the data clock signal, a latch which latches image data DATA2 in response to the sampling signal, a digital-analog converter (and/or decoder) which converts the latched image data DATA2 (e.g., data in a digital form) into a data signal in an analog form, and/or a buffer (or amplifier) which outputs the data signal to the data lines DL1 to DLm.

In an embodiment, the timing controller 140 may receive input image data DATA1 and/or a control signal CS from an external device (e.g., a host processor, a main processor, and/or an application processor), generate the gate control signal GCS and/or the data control signal DCS, based on the control signal CS, and/or generate the image data DATA2 by converting the input image data DATA1. For example, the timing controller 140 may convert the input image data DATA1 in an RGB format into the image data DATA2 in an RGBG format, which accords with a pixel arrangement in the display panel 110.

In an embodiment, at least one of the gate driver 120, the data driver 130, and the timing controller 140 may be formed in the display panel 110, and/or be implemented into one integrated circuit (IC) to be connected to the display panel 110 through a flexible circuit board. In addition, at least two of the gate driver 120, the data driver 130, and the timing controller 140 may be implemented into one IC.

Figure 2:
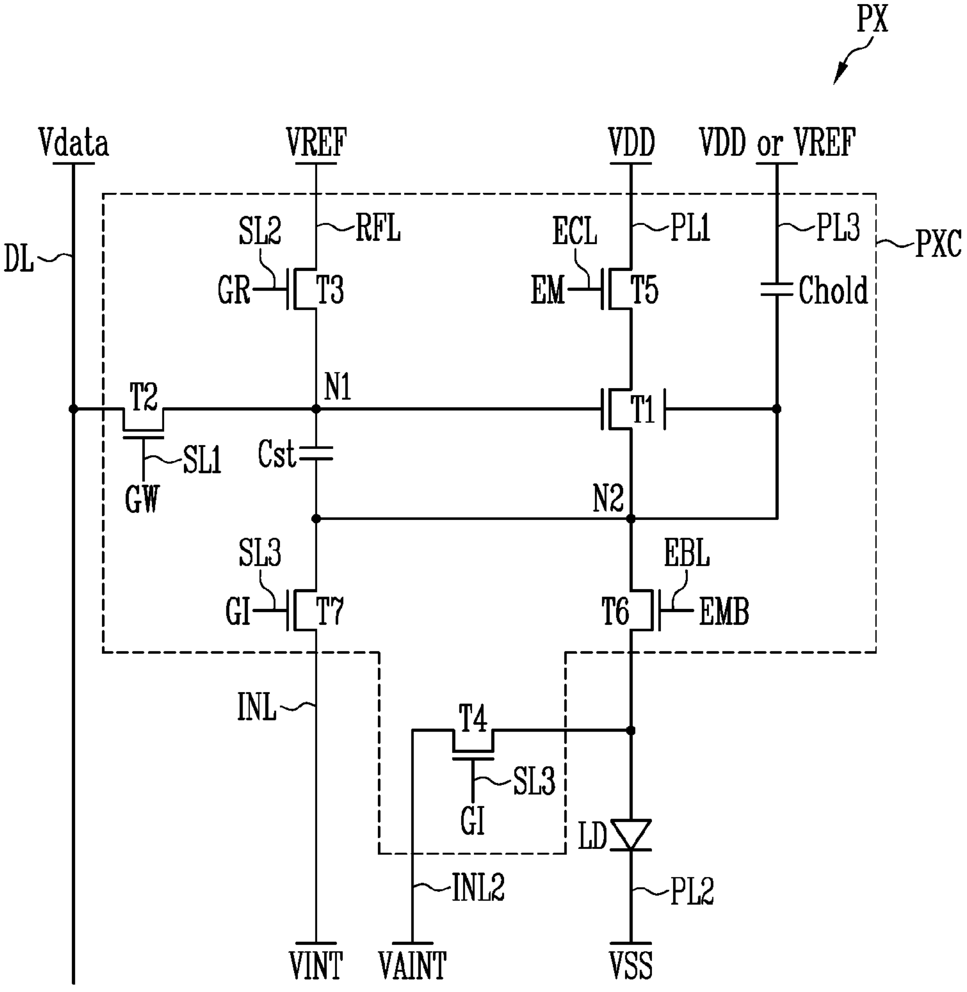
FIG. 2 is a circuit diagram illustrating an embodiment of a pixel included in the display device shown in FIG. 1.

FIG. 2 is a circuit diagram illustrating an embodiment of the pixel included in the display device shown in FIG. 1.

In an embodiment and referring to FIGS. 1 and 2, the pixel PX may be connected to a gate line GL and/or a data line DL. The gate line GL may be one of the gate lines GL1 to GLn shown in FIG. 1, and the data line DL may be one of the data lines DL1 to DLm shown in FIG. 1. The gate line GL may include a first scan line SL1, a second scan line SL2, a third scan line SL3, a first emission control line ECL, and/or a second emission control line EBL. Driving signals may be applied to the gate line GL and/or the data line DL. A first scan signal GW may be applied to the first scan line SL1, a second scan signal GR may be applied to the second scan line SL2, and/or a third scan signal GI may be applied to the third scan line SL3. A first emission control signal EM may be applied to the first emission control line ECL, a second emission control signal EMB may be applied to the second emission control line EBL, and/or a data signal Vdata (or data voltage) may be applied to the data line DL.

Also, in an embodiment, the pixel PX may be further connected to a first power line PL1, a second power line PL2, a reference power line RFL, a first initialization power line INL, and/or a second initialization power line INL2. Power voltages may be applied to the first power line PL1, the second power line PL2, the reference power line RFL, the first initialization power line INL, and/or the second initialization power line INL2. A first power voltage VDD may be applied to the first power line PL1, a second power voltage VSS may be applied to the second power line PL2, a reference power voltage VREF may be applied to the reference power line RFL, a first initialization power voltage VINT may be applied to the first initialization power line INL, and/or a second initialization power voltage VAINT may be applied to the second initialization power line INL2.

In an embodiment, a voltage level of the first power voltage VDD may be higher than a voltage level of the second power voltage VSS. A voltage level of the reference power voltage VREF may be equal to or different from the voltage level of the first power voltage VDD. A voltage level of each of the first initialization power voltage VINT and the second initialization power voltage VAINT may be lower than the voltage level of the first power voltage VDD and/or be higher than the voltage level of the second power voltage VSS. A voltage level of the first initialization power voltage VINT may be equal to or different from a voltage level of the second initialization power voltage VAINT. However, the power voltages are not limited thereto, and the voltage levels of the power voltages may be variously changed according to product specifications.

The pixel PX may include a pixel circuit PXC and/or a light emitting element LD.

In an embodiment, the pixel circuit PXC may include a first transistor T1 (or driving transistor), a second transistor T2, and/or a first capacitor Cst (or storage capacitor). Also, the pixel circuit PXC may further include a third transistor T3, a fourth transistor T4, a fifth transistor T5, a sixth transistor T6, a seventh transistor T7, and/or a second capacitor Chold (or hold capacitor).

In an embodiment, the first transistor T1 may be electrically connected between the first power line PL1 and a second node N2. For example, a first electrode of the first transistor T1 may be connected to the first power line PL1 via the fifth transistor T5, and/or a second electrode of the first transistor T1 may be connected to the second node N2. A gate electrode of the first transistor T1 may be connected to a first node N1. Also, the first transistor T1 may further include a lower electrode (or second gate electrode) corresponding to the gate electrode, and the lower electrode may be connected to the second node N2. The first transistor T1 may supply a driving current to the light emitting element LD and/or control a current amount of driving current flowing through the light emitting element LD from the first power line PL1. For example, the first transistor T1 may supply, to the light emitting element LD, a driving current corresponding to a voltage of the first node N1.

In an embodiment, the second transistor T2 may be electrically connected between the data line DL and the first node N1. Agate electrode of the second transistor T2 may be connected to the first scan line SL1. The second transistor T2 may be turned on in response to the first scan signal GW of the first scan line SL1. When the second transistor T2 is turned on, the data signal Vdata of the data line DL may be transferred to the first node N1.

In an embodiment, the third transistor T3 may be electrically connected between the reference power line RFL and the first node N1. A gate electrode of the third transistor T3 may be connected to the second scan line SL2. The third transistor T3 may be turned on in response to the second scan signal GR of the second scan line SL2. When the third transistor T3 is turned on, the reference power voltage VREF may be transferred to the first node N1.

In an embodiment, the fourth transistor T4 may be electrically connected between an anode electrode of the light emitting element LD and the second initialization power line INL2. A gate electrode of the fourth transistor T4 may be connected to the third scan line SL3. The fourth transistor T4 may be turned on in response to the third scan signal GI of the third scan line SL3. When the fourth transistor T4 is turned on, the second initialization power voltage VAINT may be transferred to the anode electrode of the light emitting element LD.

In an embodiment, the fifth transistor T5 may be electrically connected between the first power line PL1 and the first transistor T1. Agate electrode of the fifth transistor T5 may be connected to the first emission control line ECL. The fifth transistor T5 may be turned on in response to the first emission control signal EM of the first emission control line ECL.

In an embodiment, the sixth transistor T6 may be electrically connected between the second node N2 and the anode electrode of the light emitting element LD. A gate electrode of the sixth transistor T6 may be connected to the second emission control line EBL. The sixth transistor T6 may be turned on in response to the second emission control signal EMB of the second emission control line EBL.

In an embodiment, when the fifth transistor T5 and the sixth transistor T6 are turned on, a current path may be formed, through which a driving current can flow from the first power line PL1 to the second power line PL2 via the pixel circuit PXC and the light emitting element LD.

In an embodiment, the seventh transistor T7 may be electrically connected between the second node N2 and the first initialization power line INL. Agate electrode of the seventh transistor T7 may be connected to the third scan line SL3. The seventh transistor T7 may be turned on in response to the third scan signal GI of the third scan line SL3. When the seventh transistor T7 is turned on, the first initialization power voltage VINT may be transferred to the second node N2.

In an embodiment, the first capacitor Cst may be formed between the first node N1 and the second node N2 or be electrically connected between the first node N1 and the second node N2. A voltage corresponding to the data voltage Vdata may be stored in the first capacitor Cst.

In an embodiment, the second capacitor Chold may be formed between the third power line PL3 and the second node N2 or be electrically connected between the third power line PL3 and the second node N2. The second capacitor Chold may stabilize a voltage of the second node N2. The first power voltage VDD or the reference power voltage VREF may be applied to the third power line PL3. For example, when the first power voltage VDD is applied to the third power line PL3, the third power line PL3 may be electrically connected to the first power line PL1 and/or be integrally formed with the first power line PL1. In another example, when the reference power voltage VREF is applied to the third power line PL3, the third power line PL3 may be electrically connected to the reference power line RFL and/or be integrally formed with the reference power line RFL. However, the third power line PL3 is not limited thereto.

In an embodiment, the light emitting element LD may be electrically connected between the sixth transistor T6 and the second power line PL2. For example, the light emitting element LD may be connected in a forward direction between the second node N2 and the second power line PL2. When a driving current is supplied from the first transistor T1, the light emitting element LD may emit light with a luminance corresponding to the driving current.

In an embodiment, the light emitting element LD may include an organic light emitting diode. In another embodiment, the light emitting element LD may include at least one inorganic light emitting diode. The kind, size, and/or number of the light emitting element LD may be changed in some embodiments.

In an embodiment, the first to seventh transistors T1 to T7, respectively, may be implemented with an N-type transistor, but the disclosure is not limited thereto. For example, at least one of the first to seventh transistors T1 to T7, respectively, may be replaced with a P-type transistor. According to a type of each transistor, a voltage level of driving signals for controlling an operation of the transistor may be set.

In an embodiment, at least one of the first to seventh transistors T1 to T7, respectively, may include an oxide semiconductor. For example, at least one transistor including the first transistor T1 may be an oxide semiconductor transistor including an oxide semiconductor.

Figure 3:
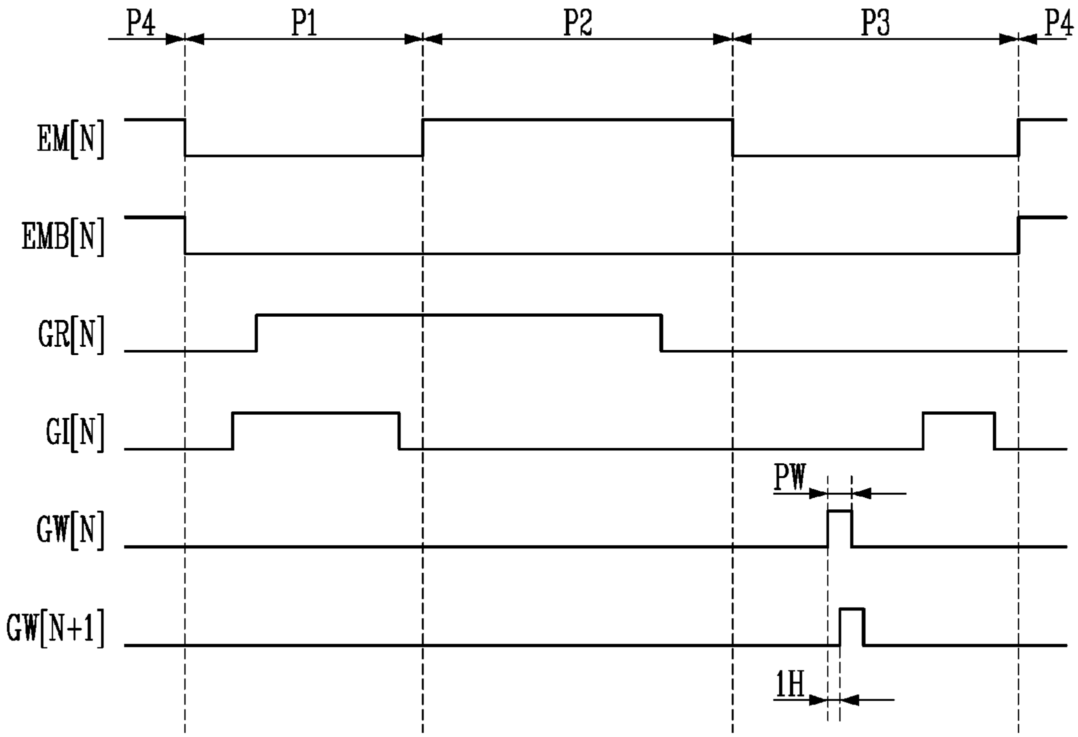
FIG. 3 is a waveform diagram illustrating an embodiment of an operation of the pixel shown in FIG. 2.
Figure 4:
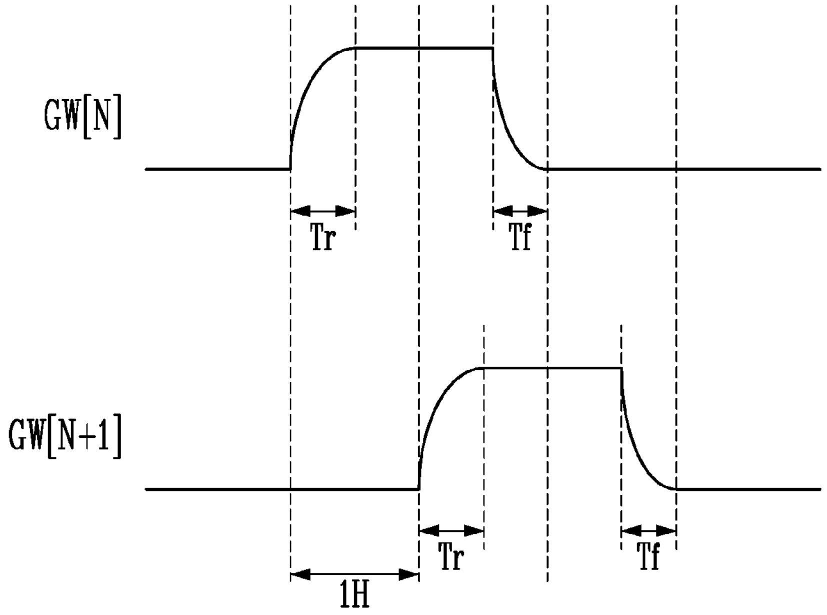
FIG. 4 is a waveform diagram illustrating first scan signals in a third period shown in FIG. 3.

FIG. 3 is a waveform diagram illustrating an embodiment of an operation of the pixel shown in FIG. 2. FIG. 4 is a waveform diagram illustrating an embodiment of first scan signals in a third period shown in FIG. 3.

First, in an embodiment and referring to FIGS. 2 and 3, one frame (or frame period in which one frame image is displayed) may include a first period P1, a second period P2, a third period P3, and a fourth period P4, which are sequentially allocated. When the pixel PX is included in an Nth pixel row, a first emission control signal EM[N], a second emission control signal EMB[N], a first scan signal GW[N], a second scan signal GR[N], and a third scan signal GI[N] may be applied to the pixel PX. Here, N may be a positive integer, and "[N]" may mean Nth. For example, "EM[N]" may mean a first emission control signal provided to the pixel PX of the Nth pixel row.

In an embodiment, the first emission control signal EM[N] may have a turn-off voltage level (gate-off voltage level, or low level) in the first period P1 and in the third period P3, and have a turn-on voltage level (gate-on voltage level, or high level) in the second period P2 and in the fourth period P4. The second emission control signal EMB[N] may have the turn-off voltage level in the first period P1, the second period P2, and the third period P3, and have the turn-on voltage level in the fourth period P4. The first period P1, the second period P2, the third period P3, and the fourth period P4 may be divided based on the first emission control signal EM[N] and the second emission control signal EMB [N].

In an embodiment, in the first period P1, the fifth transistor T5 may be turned off in response to the first emission control signal EM[N] having the turn-off voltage level, and the sixth transistor T6 may be turned off in response to the second emission control signal EMB[N] having the turn-off voltage level. Therefore, the current path may be blocked, and the light emitting element LD may emit no light.

In an embodiment, in the first period P1, the second scan signal GR[N] may have the turn-on voltage level. The third transistor T3 may be turned on, and the first node N1 (or the gate electrode of the first transistor T1) may be initialized by the reference power voltage VREF. In the first period P1, the third scan signal GI[N] may have the turn-on voltage level. The fourth transistor T4 may be turned on, the anode electrode of the light emitting element LD (or the light emitting element LD) may be initialized by the second initialization power voltage VAINT. In addition, the seventh transistor T7 may be turned on, and the second node N2 (or the first capacitor Cst) may be initialized by the first initialization power voltage VINT. That is, the pixel PX may be initialized in the first period P1. In the first period P1, an application timing of the second scan signal GR[N] having the turn-on voltage level may be later than an application timing of the third scan signal GI[N] having the turn-on voltage level, but the disclosure is not limited thereto.

In an embodiment, the first scan signal GW[N] may have the turn-off voltage level in the first period P1 and the second period P2.

In an embodiment, in the second period P2, the second scan signal GR[N] may have the turn-on voltage level. When the reference power voltage VREF is set higher than the first initialization power voltage VINT (and/or a voltage corresponding to a sum of the first initialization power voltage VINT and a threshold voltage of the first transistor T1), the first transistor T1 may maintain a turn-on state.

In an embodiment, in the second period P2, the third scan signal GI[N] may have the turn-off voltage level. The fourth transistor T4 and the seventh transistor T7 may be turned off.

Meanwhile, in an embodiment, the fifth transistor T5 may be turned on in response to the first emission control signal EM[N] having the turn-on voltage level. The voltage of the second node N2 may be changed by the driving current flowing through the first transistor T1. For example, the voltage of the second node N2 may be changed to a value obtained by subtracting the threshold voltage of the first transistor T1 from the voltage of the first node N1 (i.e., the reference power voltage VREF). Therefore, the voltage corresponding to the threshold voltage of the first transistor T1 may be stored in the first capacitor Cst. That is, the threshold voltage of the first transistor T1 may be compensated in the second period P2.

In an embodiment, in the third period P3, the second scan signal GR[N] may have the turn-off voltage level.

In an embodiment, in the third period P3, the first scan signal GW[N] may have the turn-on voltage level. The second transistor T2 may be turned on, and/or the data signal Vdata may be transferred to the first node N1. That is, the data signal Vdata (or a voltage corresponding to the data signal Vdata) may be written in the pixel PX (or the first capacitor Cst).

In an embodiment, in the third period P3, after the first scan signal GW[N] is changed to have the turn-off voltage level, the third scan signal GI[N] may have the turn-on voltage level. The second node N2 which may be changed in the writing process of the data signal Vdata may be reinitialized by the first initialization power voltage VINT. In addition, the anode electrode of the light emitting element LD may be reinitialized by the second initialization power voltage VAINT, and/or a capacitor element of the light emitting element LD may be charged by the second initialization power voltage VAINT. That is, in the third period P3, the data signal Vdata may be written in the pixel PX, and/or the pixel PX may be in a preparation state in which the pixel PX can emit light.

In an embodiment, in the fourth period P4, each of the first scan signal GW[N], the second scan signal GR[N], and the third scan signal GI[N] may have the turn-off voltage level.

In an embodiment, in the fourth period P4, the fifth transistor T5 may be turned on in response to the first emission control signal EM[N] having the turn-on voltage level, and the sixth transistor T6 may be turned on in response to the second emission control signal EMB[N] having the turn-on voltage level. A current path may be formed between the first power line PL1 and the second node N2, the first transistor T1 may supply, to the light emitting element LD, a driving current corresponding to the voltage stored in the first capacitor Cst, and the light emitting element LD may emit light with a luminance corresponding to the driving current.

In embodiments, in the third period P3, first scan signals GW[N], GW[N+1], and/or the like (and/or write scan signals) having the turn-on voltage level may be sequentially applied, and the first scan signal GW[N](or an Nth write scan signal) having the turn-on voltage level may partially overlap with a next first scan signal GW[N+1](or an (N+1)th write scan signal) having the turn-on voltage level. The next first scan signal GW[N+1] may be a first scan signal provided to an adjacent (N+1)th pixel while following an Nth pixel PX to which the first scan signal GW[N] is applied.

In an embodiment, in the third period P3, when the first scan signals GW[N], GW[N+1], and/or the like having the turn-on voltage level are sequentially output and/or provided at an interval of one horizontal time 1H, a pulse width PW of the first scan signal GW[N] having the turn-on voltage level may be greater than the one horizontal time 1H. For example, the pulse width PW of the first scan signal GW[N]

having the turn-on voltage level may be about two horizontal times (i.e., 2*1H). However, the disclosure is not limited thereto. In addition, a time for which the first scan signal GW[N] having the turn-on voltage level overlaps with the next first scan signal GW[N+1] having the turn-on voltage level may be greater than or equal to the one horizontal time 1H.

In an embodiment and referring to FIGS. 2 to 4, each of the first scan signals GW[N] and GW[N+1] is not represented as any ideal square wave, and may include a rising slew and/or a falling slew due to a signal delay caused by a load of the first scan line SL1, the pixel PX, or the like. The pulse width PW of the first scan signal GW[N], except a rising time Tr corresponding to the rising slew, may be greater than or equal to the one horizontal time 1H. In some embodiments, the pulse width PW of the first scan signal GW[N], except a falling time Tf corresponding to the falling slew and the rising time Tr, may be greater than or equal to the one horizontal time 1H.

In an embodiment, although as will be described later with reference to FIGS. 12 and 13, when the first scan signals GW_C[N] and GW_C[N+1] are output while not overlapping with each other, the one horizontal time 1H may be set by considering the rising time Tr and the falling time Tf. Therefore, there may be a limitation in decreasing the one horizontal time 1H due to the rising time Tr and/or the falling time Tf, which are fixed according to the load, and/or it may be difficult to perform high-frequency driving of the display device 100 by using the first scan signals GW_C[N] and GW_C[N+1] not overlapping with each other. Meanwhile, in accordance with embodiments, when the first scan signals GW[N] and GW[N+1] are output while partially overlapping with each other (i.e., when the first scan signals GW[N] and GW[N+1] are driven while overlapping with each other), the one horizontal time 1H may be set by considering only the falling time Tf among the rising and falling times Tr and Tf, respectively. Thus, the one horizontal time 1H may be relatively decreased, and/or the high-frequency driving of the display device 100 may be performed using the first scan signals GW[N] and GW[N+1].

Figure 5:
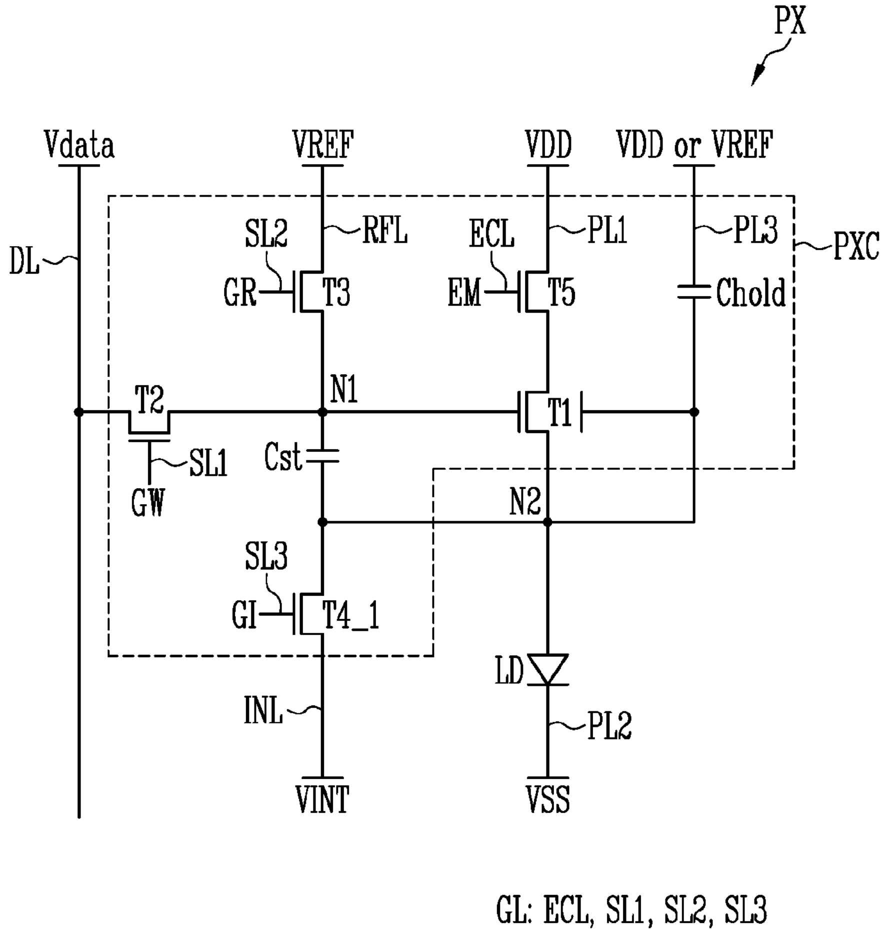
FIG. 5 is a circuit diagram illustrating an embodiment of the pixel included in the display device shown in FIG. 1.
Figure 6:
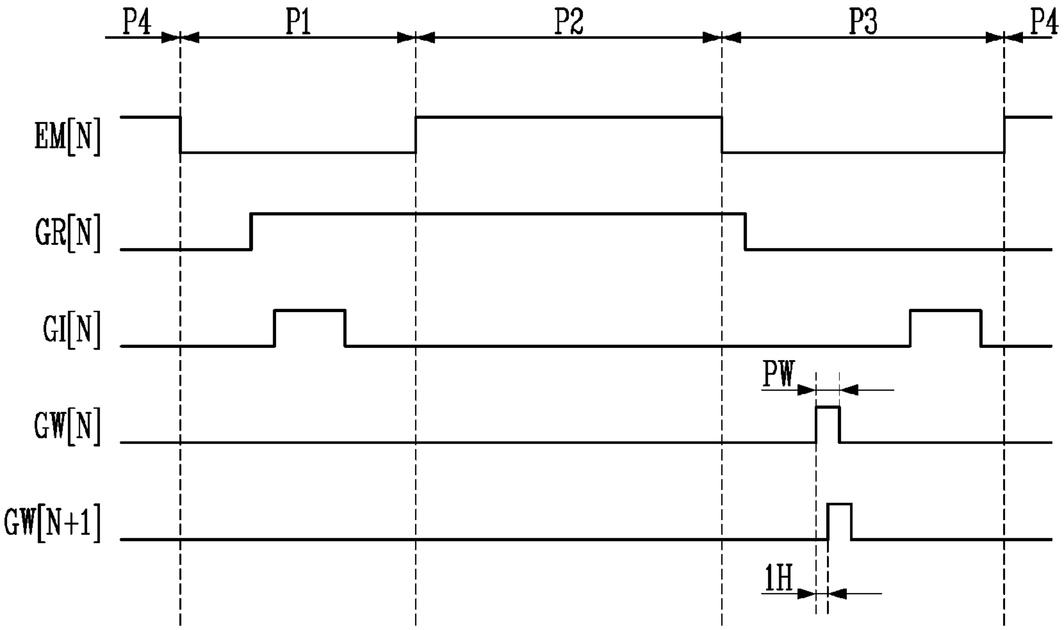
FIG. 6 is a waveform diagram illustrating an embodiment of an operation of the pixel shown in FIG. 5.

FIG. 5 is a circuit diagram illustrating an embodiment of the pixel included in the display device shown in FIG. 1. FIG. 6 is a waveform diagram illustrating an embodiment of an operation of the pixel shown in FIG. 5.

First, in an embodiment and referring to FIGS. 1, 2, and 5, with respect to the pixel PX shown in FIG. 2, the pixel PX shown in FIG. 5 does not include the fourth transistor T4 and the sixth transistor T6 of the pixel PX shown in FIG. 2, but may include a fourth transistor T4_1 instead of the seventh transistor T7 of the pixel PX shown in FIG. 2. The fourth transistor T4_1 shown in FIG. 5 may be substantially identical to the seventh transistor T7 shown in FIG. 2. That is, the pixel PX shown in FIG. 5 may be substantially identical or similar to the pixel PX shown in FIG. 2, except the fourth transistor T4 and/or the sixth transistor T6 of the pixel PX shown in FIG. 2. Therefore, overlapping descriptions will not be repeated.

In an embodiment, the fourth transistor T4_1 may be electrically connected between the second node N2 and the first initialization power line INL. Agate electrode of the fourth transistor T4_1 may be connected to the third scan line SL3. The fourth transistor T4_1 may be turned on in response to the third scan signal GI of the third scan line SL3. When the fourth transistor T4_1 is turned on, the first initialization power voltage VINT may be transferred to the second node N2.

In an embodiment, the light emitting element LD may be electrically connected between the second node N2 and the second power line PL2.

In an embodiment and referring to FIGS. 2 to 6, a first emission control signal EM[N], a first scan signal GW[N], and a next first scan signal GW[N+1], which are shown in FIG. 6, may be substantially identical to the first emission control signal EM[N], the first scan signal GW[N], and the next first scan signal GW[N+1], which are shown in FIG. 3, respectively.

In an embodiment, in the first period P1, a second scan signal GR[N] may have the turn-on voltage level. The third transistor T3 may be turned on, and the first node N1 (or the gate electrode of the first transistor T1) may be initialized by the reference power voltage VREF. In the first period P1, a third scan signal GI[N] may have the turn-on voltage level. The fourth transistor T4_1 may be turned on, and the second node N2 (or the anode electrode of the light emitting element LD and the first capacitor Cst) may be initialized by the first initialization power voltage VINT. That is, the pixel PX may be initialized in the first period P1. In the first period P1, an application timing of the second scan signal GR[N] having the turn-on voltage level may be earlier than an application timing of the third scan signal GI[N] having the turn-on voltage level, but the disclosure is not limited thereto.

In an embodiment, in the second period P2, the second scan signal GR[N] may have the turn-on voltage level, and the third scan signal GI[N] may have the turn-off voltage level. As described with reference to FIG. 3, the threshold voltage of the first transistor T1 may be compensated in the second period P2.

Meanwhile, in an embodiment, in order to maintain the light emitting element LD to be in anon-emission state during the second period P2, the reference power voltage VREF may be set to a voltage level at which the light emitting element LD can be maintained in the non-emission state.

In an embodiment, in the third period P3, the second scan signal GR[N] may have the turn-off voltage level. In the third period P3 (i.e., after the first emission control signal EM[N] is changed from the turn-on voltage level to the turn-off voltage level), the second scan signal GR[N] may be changed to have the turn-off voltage level from the turn-on voltage level such that the light emitting element LD is maintained in the non-emission state in the second period P2.

In an embodiment, after the second scan signal GR[N] is changed to have the turn-off voltage level in the third period P3, the operation of the pixel PX in the third period P3 and the fourth period P4 may be substantially identical or similar to the operation of the pixel PX in the third period P3 and the fourth period P4, which are shown in FIG. 3. Therefore, overlapping descriptions will not be repeated.

In the embodiment shown in FIG. 6, the first scan signal GW[N](or an Nth write scan signal) having the turn-on voltage level may partially overlap with the next first scan signal GW[N+1](or an (N+1)th write scan signal) having the turn-on voltage level. A pulse width PW of the first scan signal GW[N] having the turn-on voltage level may be greater than one horizontal time 1H. In addition, a time for which the first scan signal GW[N] having the turn-on voltage level overlaps with the next first scan signal GW[N+1] having the turn-on voltage level may be greater than or equal to the one horizontal time 1H.

In an embodiment, as described above, even when the circuit structure of the pixel PX is changed as compared with the embodiment shown in FIG. 2, the first scan signals GW[N] and GW[N+1] can be output while partially overlapping with each other.

Figure 7:
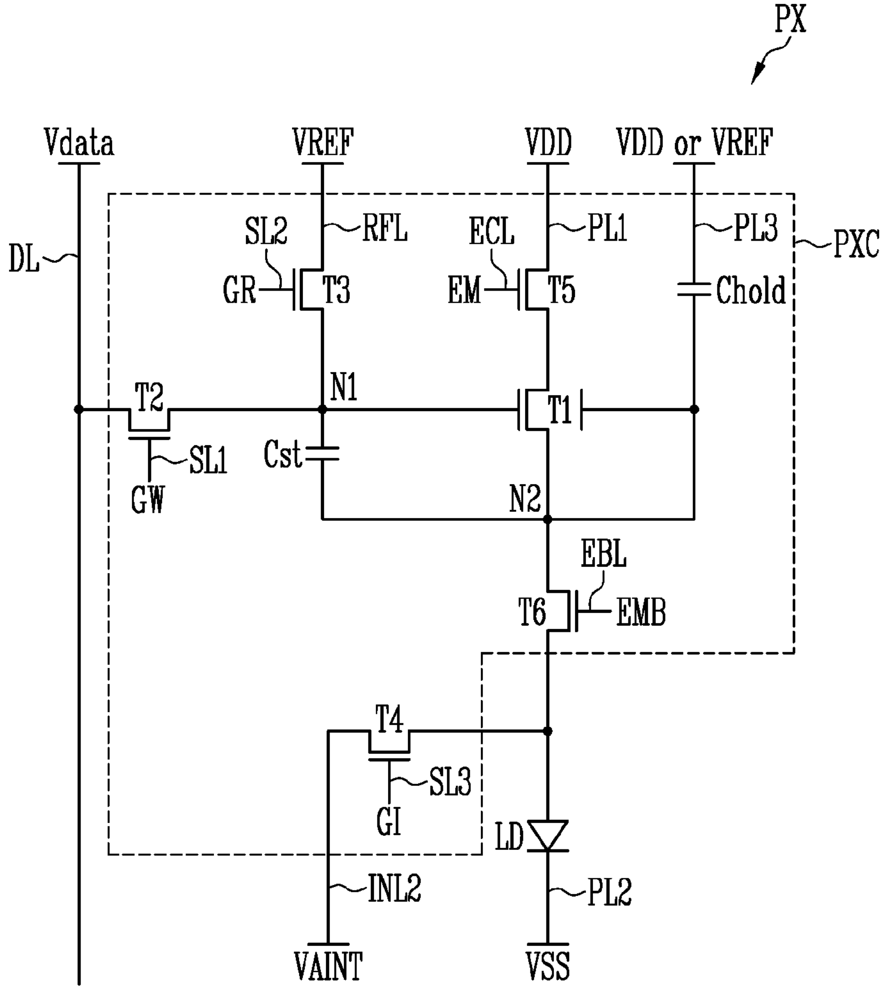
FIG. 7 is a circuit diagram illustrating an embodiment of the pixel included in the display device shown in FIG. 1.
Figure 8:
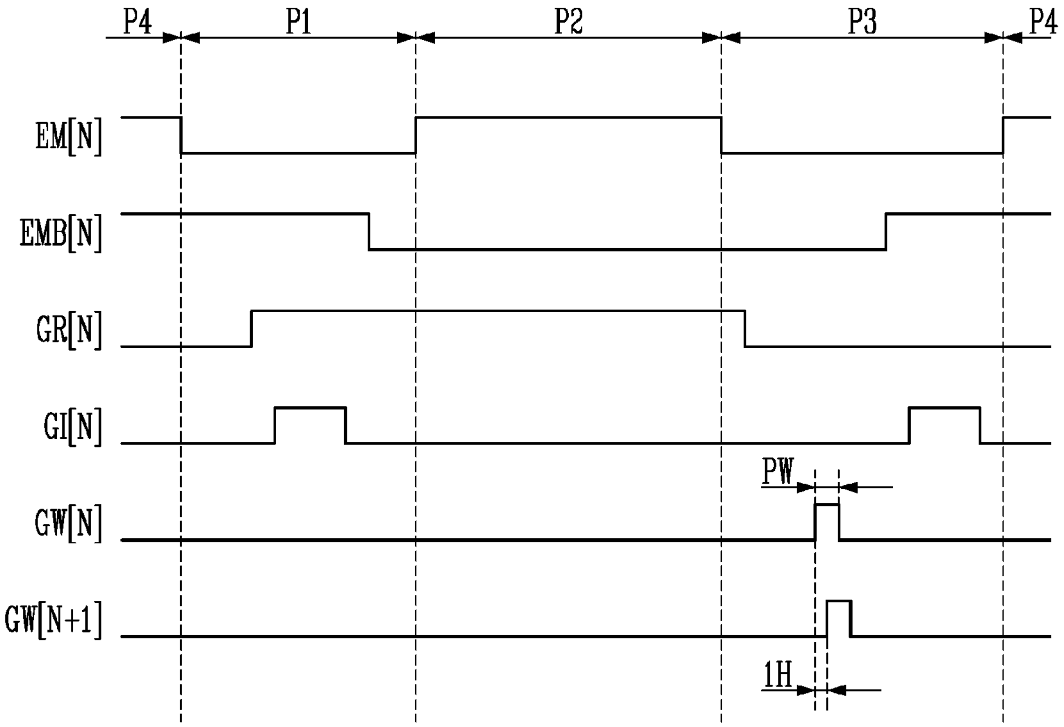
FIG. 8 is a waveform diagram illustrating an embodiment of an operation of the pixel shown in FIG. 7.

FIG. 7 is a circuit diagram illustrating an embodiment of the pixel included in the display device shown in FIG. 1. FIG. 8 is a waveform diagram illustrating an embodiment of an operation of the pixel shown in FIG. 7.

First, in an embodiment and referring to FIGS. 1, 2, and 7, with respect to the pixel PX shown in FIG. 2, the pixel PX shown in FIG. 7 may not include the seventh transistor T7 of the pixel PX shown in FIG. 2. That is, the pixel PX shown in FIG. 7 may be substantially identical or similar to the pixel PX shown in FIG. 2, except the seventh transistor T7 of the pixel PX shown in FIG. 2. Therefore, overlapping descriptions will not be repeated.

In an embodiment and referring to FIGS. 2, 7, and 8, a first emission control signal EM[N], a first scan signal GW[N], and a next first scan signal GW[N+1], which are shown in FIG. 8, may be substantially identical to the first emission control signal EM[N], the first scan signal GW[N], and the next first scan signal GW[N+1], which are shown in FIG. 3, respectively.

In an embodiment, in the first period P1, a second emission control signal EMB[N] may have the turn-on voltage level. The sixth transistor T6 may be turned on, and the second node N2 may be electrically connected to the anode electrode of the light emitting element LD.

In an embodiment, in the first period P1, a second scan signal GR[N] may have the turn-on voltage level. The third transistor T3 may be turned on, and the first node N1 (or the gate electrode of the first transistor T1) may be initialized by the reference power voltage VREF. In the first period P1, a third scan signal GI[N] may have the turn-on voltage level. The fourth transistor T4 may be turned on, and the anode electrode of the light emitting element LD may be initialized by the second initialization power voltage VAINT. In addition, the second node N2 and the anode electrode of the light emitting element LD are in a state in which the second node N2 and the anode electrode of the light emitting element LD are electrically connected to each other by the turned-on sixth transistor T6, and therefore, the second node N2 may be initialized by the second initialization power voltage VAINT. In the first period P1, an application timing of the second scan signal GR[N] having the turn-on voltage level may be earlier than an application timing of the third scan signal GI[N] having the turn-on voltage level, but the disclosure is not limited thereto.

In an embodiment, in the second period P2, the second scan signal GR[N] may have the turn-on voltage level, and the third scan signal GI[N] may have the turn-off voltage level. As described with reference to FIG. 3, the threshold voltage of the first transistor T1 may be compensated in the second period P2.

In an embodiment, in the third period P3, the second scan signal GR[N] may have the turn-off voltage level. In the third period P3, the second scan signal GR[N] may be changed to have the turn-off voltage level from the turn-on voltage level, but the disclosure is not limited thereto.

In an embodiment, the operation of the pixel PX in the third period P3 and the fourth period P4 may be substantially identical or similar to the operation of the pixel PX in the third period P3 and the fourth period P4, which are shown in FIG. 3. Therefore, overlapping descriptions will not be repeated.

In the embodiment shown in FIG. 8, the first scan signal GW[N](or an Nth write scan signal) having the turn-on voltage level may partially overlap with the next first scan signal GW[N+1](or an (N+1)th write scan signal) having the turn-on voltage level. A pulse width PW of the first scan signal GW[N] having the turn-on voltage level may be greater than one horizontal time 1H. In addition, a time for which the first scan signal GW[N] having the turn-on voltage level overlaps with the next first scan signal GW[N+1] having the turn-on voltage level may be greater than or equal to the one horizontal time1H.

In an embodiment and as described above, even when the circuit structure of the pixel PX is changed as compared with the embodiment shown in FIG. 2, the first scan signals GW[N] and GW[N+1] can be output while partially overlapping with each other.

Figure 9:
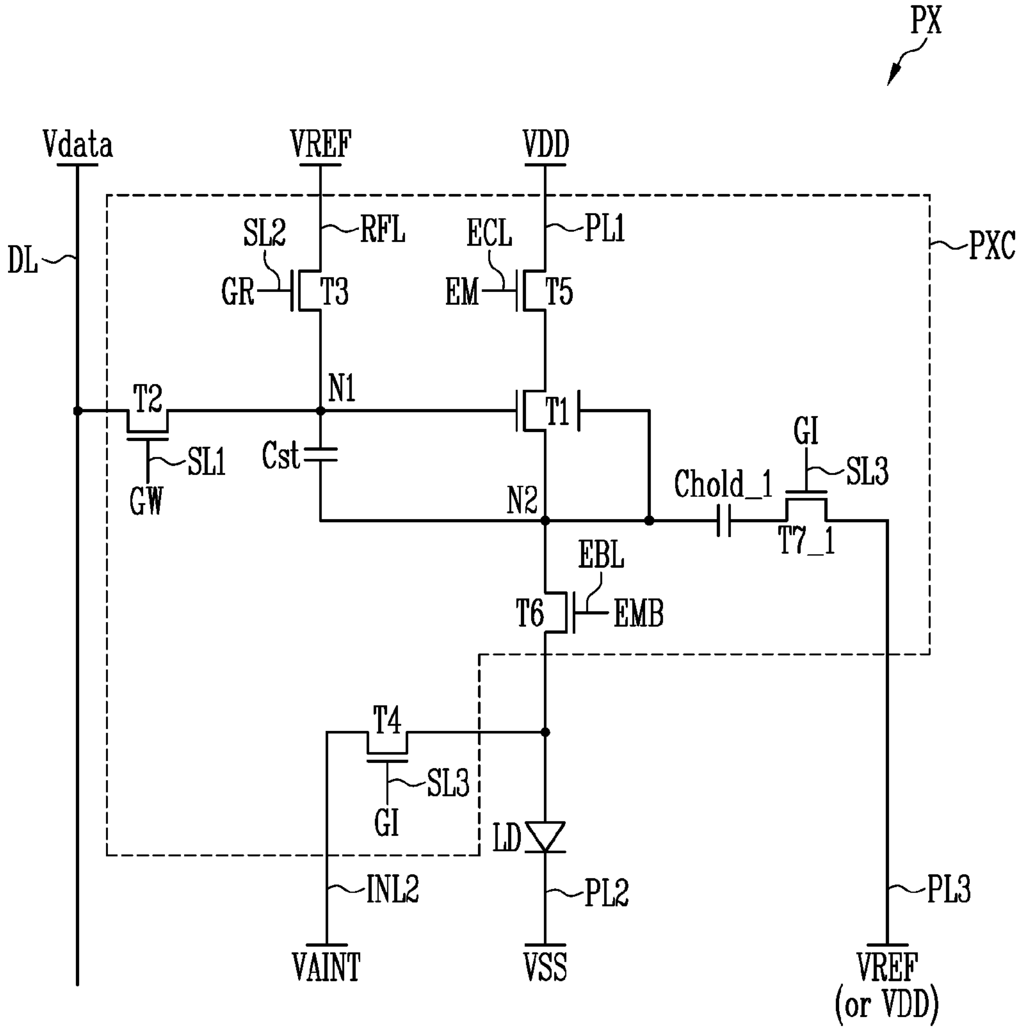
FIG. 9 is a circuit diagram illustrating an embodiment of the pixel included in the display device shown in FIG. 1.

FIG. 9 is a circuit diagram illustrating an embodiment of the pixel included in the display device shown in FIG. 1.

In an embodiment and referring to FIGS. 1, 2, and 9, with respect to the pixel PX shown in FIG. 2, a pixel PX shown in FIG. 9 may include a seventh transistor T7_1 and a second capacitor Chold_1 instead of the seventh transistor T7 and the second capacitor Chold of the pixel PX shown in FIG. 2. The pixel PX shown in FIG. 9 may be substantially identical or similar to the pixel PX shown in FIG. 2, except for the seventh transistor T7_1 and the second capacitor Chold_1. Therefore, overlapping descriptions will not be repeated.

In an embodiment, the seventh transistor T71 may be electrically connected between the second node N2 (or the second capacitor Chold_1) and the third power line PL3. A gate electrode of the seventh transistor T71 may be connected to the third scan line SL3. The seventh transistor T71 may be turned on in response to the third scan signal GI of the third scan line SL3. When the seventh transistor T7_1 is turned on, the reference power voltage VREF (or the first power voltage VDD) applied to the third power line PL3 may be transferred to the second node N2 through the second capacitor Chold_1.

In an embodiment, the second capacitor Chold_1 may be formed between the seventh transistor T7_1 and the second node N2 and/or be electrically connected to each other between the seventh transistor T7_1 and the second node N2.

The pixel PX shown in FIG. 9 may be operated in accordance with the embodiment shown in FIG. 3. However, the disclosure is not limited thereto. For example, the pixel PX shown in FIG. 9 may be operated in accordance with the embodiment shown in FIG. 8. In accordance with the embodiment shown in FIG. 3 or 8, with respect to the pixel PX shown in FIG. 9, the first scan signals GW[N] and/or GW[N+1] can be output while partially overlapping with each other.

Figure 10:
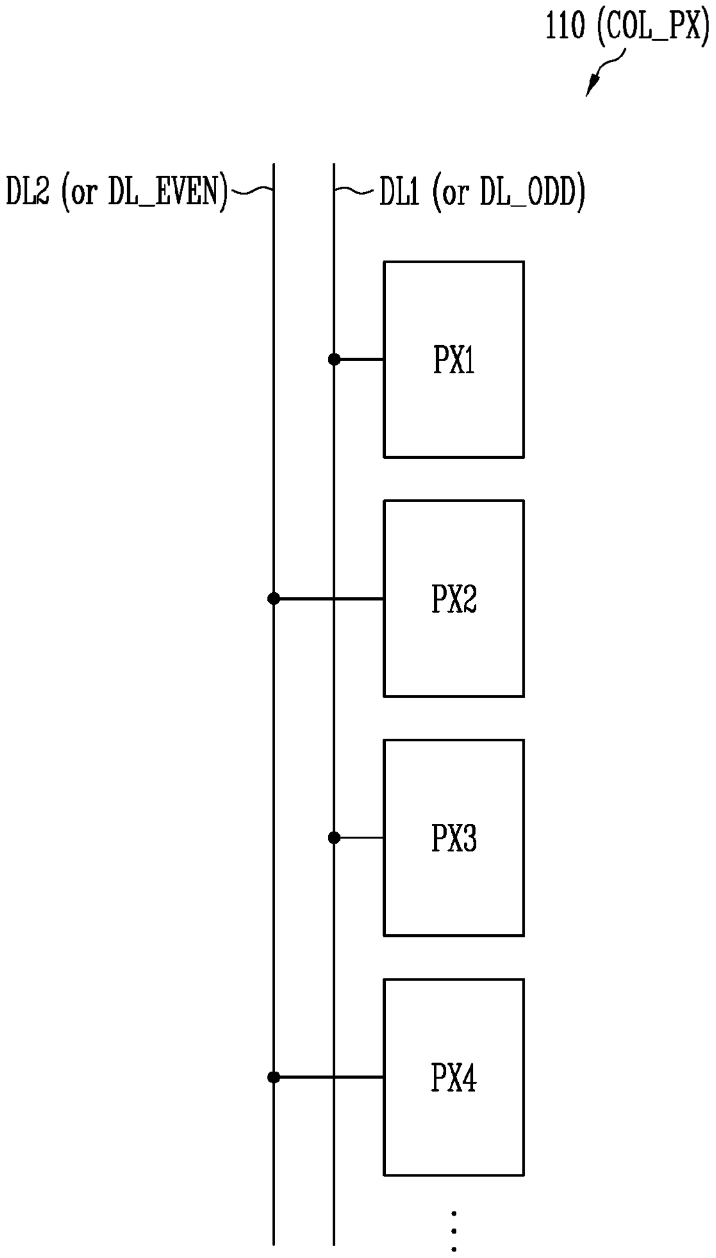
FIG. 10 is a schematic diagram illustrating an embodiment of a display panel included in the display device shown in FIG. 1.
Figure 11:
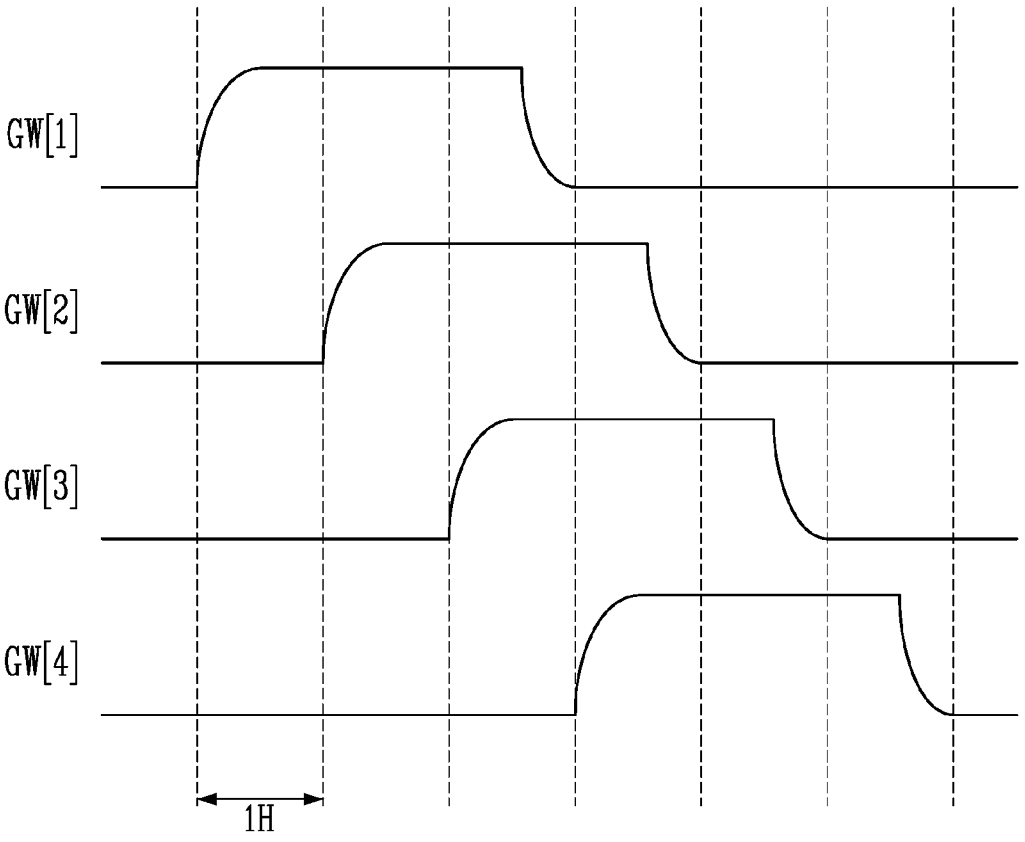
FIG. 11 is a waveform diagram illustrating an embodiment of first scan signals provided to pixels shown in FIG. 10.

FIG. 10 is a schematic diagram illustrating an embodiment of the display panel included in the display device shown in FIG. 1. In FIG. 10, an embodiment of a display panel 110 is briefly illustrated with respect to one pixel column COL_PX. FIG. 11 is a waveform diagram illustrating an embodiment of first scan signals provided to pixels shown in FIG. 10.

In an embodiment and referring to FIGS. 1 and 10, one pixel column COL_PX may include pixels PX1 to PX4. For example, the pixel column COL_PX may include a first pixel PX1 of a first pixel row, a second pixel PX2 of a second pixel row, a third pixel PX3 of a third pixel row, and a fourth pixel PX4 of a fourth pixel row.

In an embodiment, the pixels PX1 to PX4 may be alternately connected to at least two data lines. When two data lines, e.g., first and second data lines DL1 and DL2 are provided to the one pixel column COL_PX, the first pixel PX1 and the third pixel PX3 may be electrically connected to the first data line DL1, and the second pixel PX2 and the fourth pixel PX4 may be electrically connected to the second data line DL2. That is, among the pixels PX1 to PX4 included in the one pixel column COL_PX, odd-numbered pixels may be connected to an odd-numbered data line DL_ODD, and even-numbered pixels may be connected to an even-numbered data line DL_EVEN.

In an embodiment and referring to FIGS. 1 to 4, 10, and 11, in the third period P3 shown in FIG. 3, first scan signals GW[1] to GW[4] may be provided to the pixels PX1 to PX4. A first first scan signal GW[1](or first write scan signal) may be provided to the first pixel PX1 of the first pixel row, a second first scan signal GW[2](or second write scan signal) may be provided to the second pixel PX2 of the second pixel row, a third first scan signal GW[3](or third write scan signal) may be provided to the third pixel PX3 of the third pixel row, and a fourth first scan signal GW [4](or fourth write scan signal) may be provided to the fourth pixel PX4 of the fourth pixel row.

In an embodiment, waveforms of the first scan signals GW[1] to GW[4] having the turn-on voltage level are substantially identical or similar to the waveforms of the first scan signals GW[N] and GW[N+1] shown in FIG. 4, and therefore, overlapping descriptions will not be repeated.

In embodiments, the first scan signals GW[1] to GW[4] (or write scan signals) having the turn-on voltage level may be sequentially applied at an interval of one horizontal time 1H, and may partially overlap with a first scan signal provided to an adjacent pixel row.

In an embodiment, a pulse width of the first scan signals GW[1] to GW[4] having the turn-on voltage level may be greater than or equal to three horizontal times (i.e., 3*1H). For example, a pulse width of each of the first scan signals GW[1] to GW[4] having the turn-on voltage level may be about three horizontal times. In addition, a time for which the first scan signals GW[1] to GW[4] having the turn-on voltage level overlap with the first scan signal provided to the adjacent pixel row may be greater than or equal to two horizontal times (i.e., 2*1H). For example, a time for which the first first scan signal GW[1] and the second first scan signal GW[2] overlap with each other may be about two horizontal times.

In an embodiment, as described with reference to FIG. 10, since the pixels PX1 to PX4 are alternately connected to the at least two data lines, a data signal for one pixel may be applied to one data line for at least two horizontal times. For example, since the first pixel PXT and the third pixel PX3 are connected to the first data line DL1, and the second pixel PX2 and the fourth pixel PX4 are not connected to the first data line DL1, data signals for the second pixel PX2 and the fourth pixel PX4 are not mixed with data signals for the first pixel PXT and the third pixel PX3, and it is sufficient that a data signal for the third pixel PX3 may be applied in a period in which the third first scan signal GW[3] does not overlap with the first first scan signal GW[1]. In this manner, for example, a data signal for the first pixel PX1 may be applied to the first data line DL1 for the other two horizontal times except a rising time of the first first scan signal GW[1]. Similarly, the data signal for the third pixel PX3 may be applied to the first data line DL1 for the other horizontal times except a rising time of the third first scan signal GW[3](and/or a time for which the third first scan signal GW[3] overlaps with the first first scan signal GW[1]). Similarly, a data signal for the second pixel PX2 may be applied to the second data line DL2 for the other two horizontal times except for a rising time of the second first scan signal GW[2], and a data signal for the fourth pixel PX4 may be applied to the second data line DL2 for the other two horizontal times except for a rising time of the fourth first scan signal GW[4].

In an embodiment, in this manner, when pixels included in one pixel column COL_PX are alternately connected to x (x is an integer greater than or equal to 2) data lines, a pulse width of each of first scan signals for the pixels (i.e., for writing a data signal in the pixels) may be set to about (x+1) horizontal times, and the data signal may be set to be written in each of the pixels for x horizontal times. Thus, although the first scan signals are sequentially output at an interval of one horizontal time 1H, a writing time (i.e., the x horizontal times) of the data signal can be sufficiently secured corresponding to the number (i.e., x) of data lines. In other words, when the writing time of the data signal is fixed, the number of data lines is increased, so that the one horizontal time 1H (i.e., the interval at which the first scan signals are sequentially applied) can be decreased. Accordingly, the display device 100 can perform high-resolution driving and/or high-frequency driving.

Figure 12:
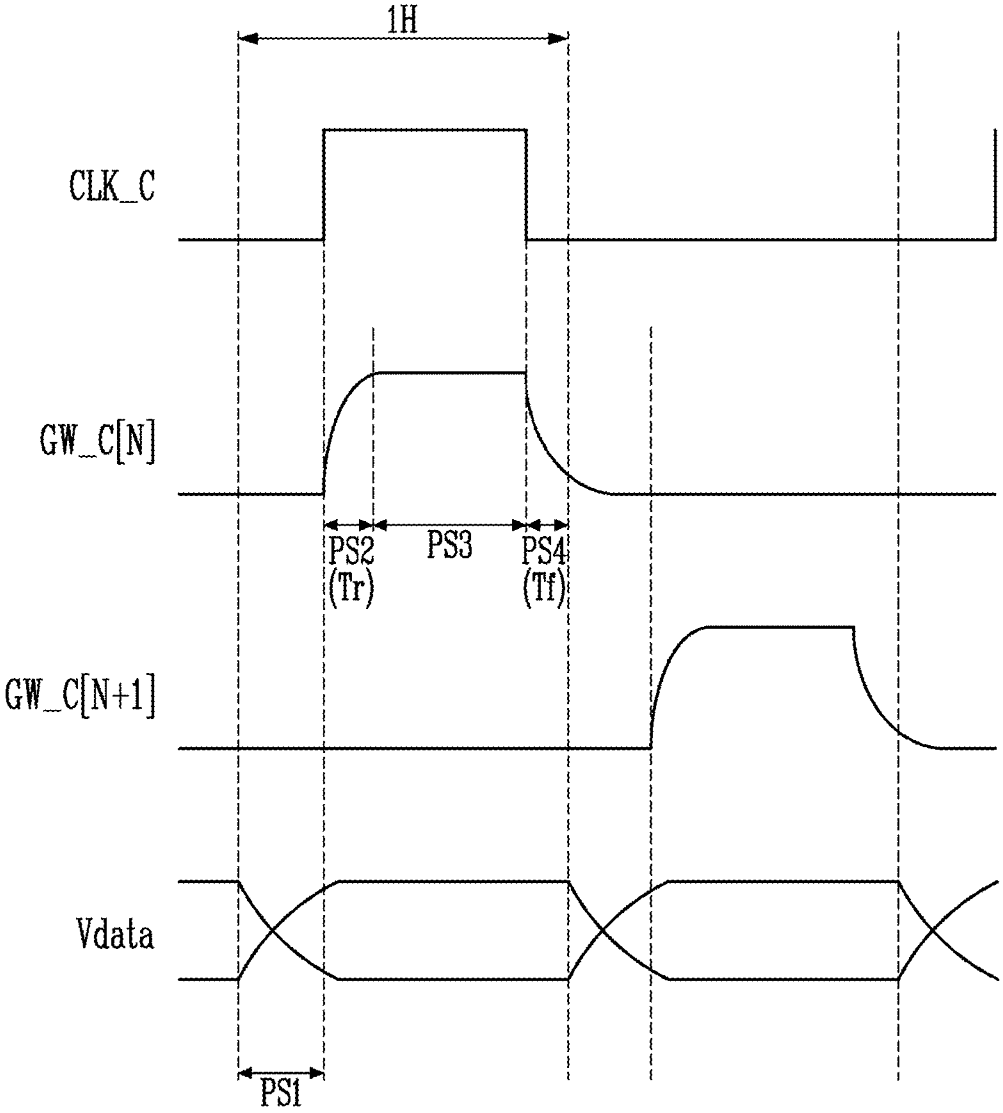
FIG. 12 is a waveform diagram illustrating a comparative example of signals measured in the display device shown in FIG. 1, in an embodiment.
Figure 13:
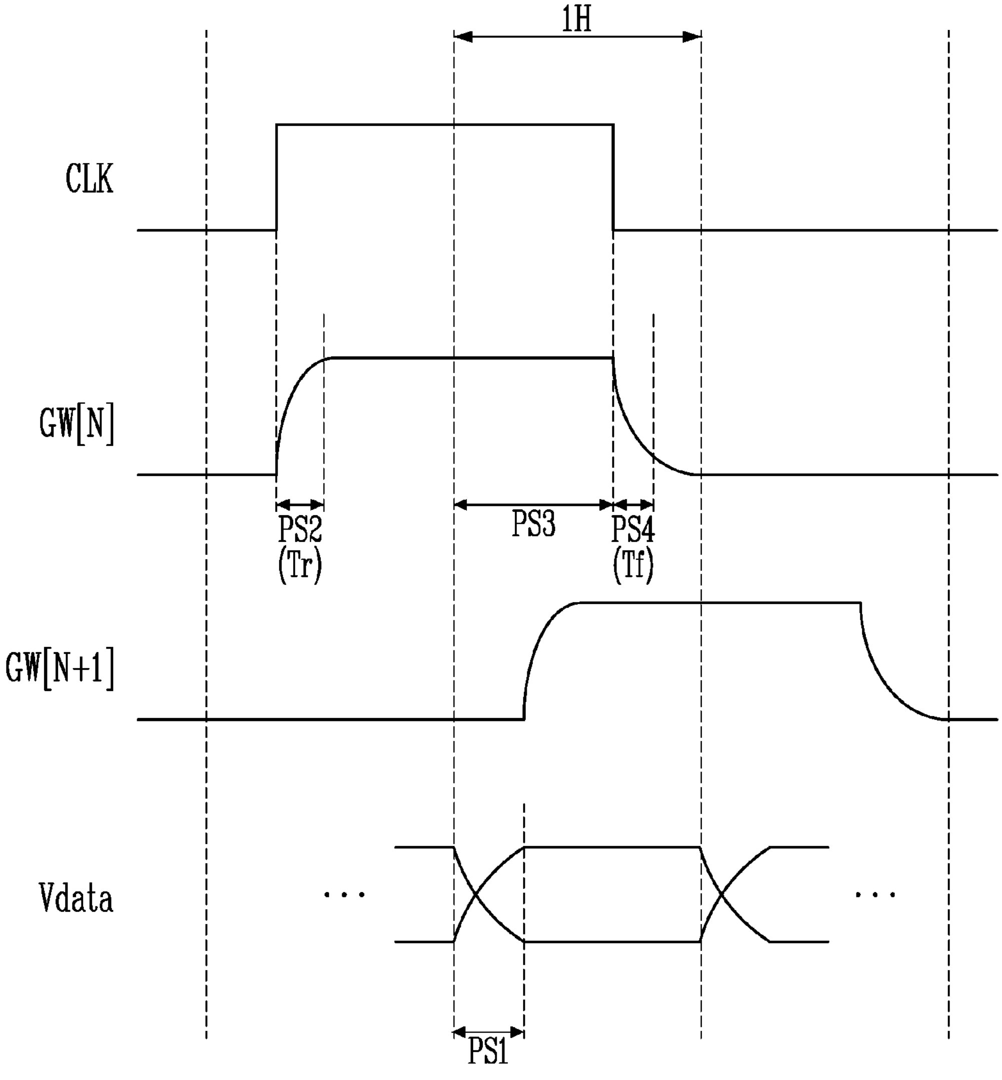
FIG. 13 is a waveform diagram illustrating an embodiment of the signals measured in the display device shown in FIG. 1.

FIG. 12 is a waveform diagram illustrating one embodiment of a comparative example of signals measured in the display device shown in FIG. 1. FIG. 13 is a waveform diagram illustrating an embodiment of the signals measured in the display device shown in FIG. 1.

In an embodiment and referring to FIGS. 1 to 3 and 12, a clock signal CLK_C may be provided to the gate driver 120, and the gate driver 120 may output first scan signals GW_C[N] and GW_C[N+1] corresponding to the clock signal CLK_C while not overlapping with each other. A period in which the clock signal CLK_C has the turn-on voltage level may be smaller than one horizontal time 1H, and a cycle of the clock signal CLK_C may be two horizontal times. A pulse width of the first scan signals GW_C [N] and GW_C[N+1] may be smaller than the one horizontal time 1H, corresponding to the clock signal CLK_C.

In an embodiment, a data signal Vdata may be changed using the one horizontal time 1H as a cycle, corresponding to the one horizontal time 1H as an interval of the first scan signals GW_C[N] and GW_C[N+1].

In an embodiment, a first sub-period PS1 is a time for which the changed data signal Vdata is set or changed. For example, the first sub-period PS1 may be about 1.05 μs by considering a load of a data line, and/or the like. A second sub-period PS2 is a time for which a first scan signal GW_C[N] reaches the turn-on voltage level (or 90% thereof), and corresponds to a rising time Tr of the first scan signal GW_C[N]. For example, the second sub-period PS2 may be about 1.55 μs by considering a load of a first scan line, and/or the like. A third sub-period PS3 is a time for which the data signal Vdata is written (or charged) in the pixel PX, and a minimum of 1.18 μs may be required as the third sub-period PS3. A fourth sub-period PS4 is a time for which the first scan signal GW_C[N] reaches the turn-off voltage level (or 10% thereof), and corresponds to a falling time Tf of the first scan signal GW_C[N]. For example, the fourth sub-period PS4 may be about 0.72 μs.

In an embodiment, when the first scan signals GW_C[N] and GW_C[N+1] are output while not overlapping with each other, the one horizontal time 1H may be set by considering the first sub-period PS1, the second sub-period PS2, the third sub-period PS3, and the fourth sub-period PS4. For example, the one horizontal time 1H in accordance with the comparative example may be a minimum of 4.5 μs.

In an embodiment and referring to FIGS. 1 to 13, a clock signal CLK may be provided to the gate driver 120, and the gate driver 120 may sequentially output first scan signals GW_C[N] and GW_C[N+1] corresponding to the clock signal CLK while partially overlapping with each other. A period in which the clock signal CLK has the turn-on voltage level may be greater than one horizontal time 1H, and a cycle of the clock signal CLK may be greater than or equal to three horizontal times. A pulse width of the first scan signals GW_C[N] and GW_C[N+1] having the turn-on voltage level may be greater than the one horizontal time 1H, corresponding to the clock signal CLK.

In an embodiment, a data signal Vdata may be changed using the one horizontal time 1H as a cycle. The data signal Vdata corresponding to a first scan signal GW[N] may be applied in a period in which the first scan signal GW[N] overlaps with a next first scan signal GW[N+1](or a period in which the first scan signal GW[N] does not overlap with a previous first scan signal). The data signal Vdata corresponding to the next first scan signal GW[N+1] may be applied in a period in which the next first scan signal GW[N+1] does not overlap with the first scan signal GW[N] (i.e., the previous first scan signal of the next first scan signal GW[N+1]).

In an embodiment, when the first scan signals GW_C[N] and GW_C[N+1] are output while overlapping with each other, the one horizontal time 1H may be set by considering only the third sub-period PS3 and the fourth sub-period PS4 except for the first sub-period PS1 and the second sub-period PS2. For example, the one horizontal time 1H in accordance with the embodiments of the present disclosure may be a minimum of 1.9 μs. In the case of the embodiment shown in FIG. 11, the two horizontal times are set by considering only the third sub-period PS3 and the fourth sub-period PS4, and therefore, the one horizontal time 1H may be set to a minimum of 0.95 μs.

That is, as compared with the one horizontal time 1H of the comparative example, the one horizontal time 1H in accordance with embodiments can be decreased by two times or more. In other words, the first scan signals GW_C [N] and GW_C[N+1] can be output at a high frequency of two times or more, and accordingly, the display device 100 can be driven at a high frequency of two times or more. In addition, when one frame period is fixed, a total time for which the first scan signals GW_C[N] and GW_C[N+1] are output, i.e., the other time except the third period P3 shown in FIG. 3 (e.g., the first period P1, the second period P2, and the fourth period P4) can be sufficiently set and/or be freely changed, and accordingly, the display device 100 can be more stably driven. Further, the width of a blank period between frame periods can be more sufficiently set. For example, when the display device 100 is provided with a sensing device for touch input and/or be coupled to the sensing device, a driving time of the sensing device driven in the blank period to prevent interference with the display device 100 can be more sufficiently secured.

As described above, in accordance with embodiments, when the first scan signals GW_C[N] and GW_C[N+1] are output while partially overlapping with each other (i.e., overlapping driving of the first scan signals GW_C[N] and GW_C[N+1]), the one horizontal time 1H can be set by considering only a data writing time (i.e., the third sub-period PS3) and a falling time (i.e., the fourth sub-period PS4), except for a data setting time (i.e., the first sub-period PS1) and a rising time (i.e., the second sub-period PS2). Thus, the one horizontal time 1H is relatively decreased, and the high-frequency driving of the display device 100 can be performed using the first scan signals GW_C[N] and GW_C [N+1].

Figure 14:
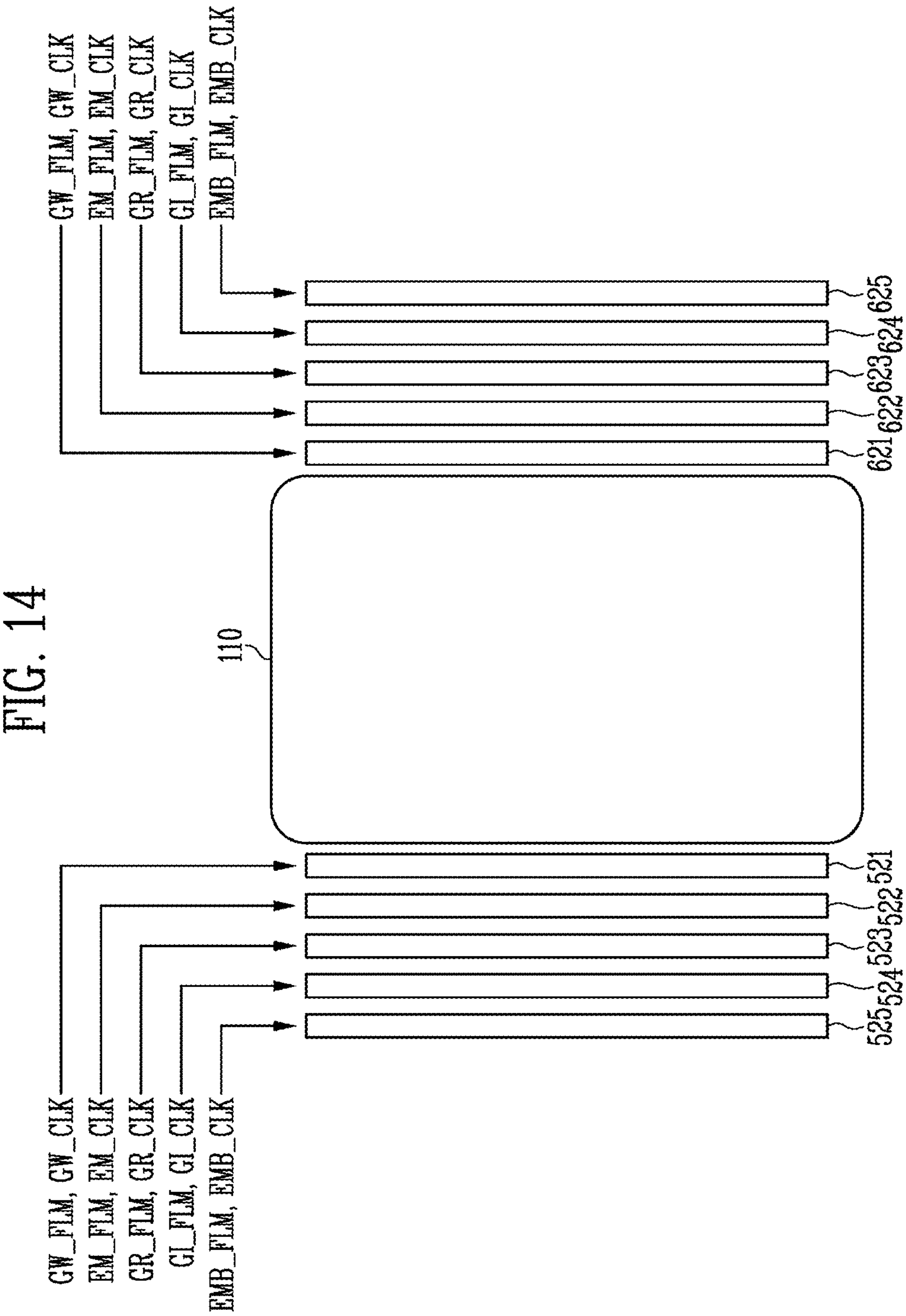
FIG. 14 is a schematic diagram illustrating an embodiment of a gate driver included in the display device shown in FIG. 1.

FIG. 14 is a schematic diagram illustrating an embodiment of the gate driver included in the display device shown in FIG. 1. For convenience of description, the display panel 110 in addition to the gate driver 120 is further illustrated in FIG. 14.

In an embodiment and referring to FIGS. 1, 2, and 14, in order to drive the pixel PX shown in FIG. 2, the gate driver 120 may include first to fifth gate drivers 521 to 525 (or first to fifth sub-drivers), respectively. Also, the gate driver 120 may further include sixth to tenth gate drivers 621 to 625 (or sixth to tenth sub-drivers), respectively.

In an embodiment, the first to fifth gate drivers 521 to 525, respectively, may be disposed at one side of the display panel 110, and the sixth to tenth gate drivers 621 to 625, respectively, may be disposed at the other side of the display panel 110.

In an embodiment, each of the first gate driver 521 (or first scan driver) and the sixth gate driver 621 may generate the first scan signal GW shown in FIG. 2, based on a first scan start signal GW_FLM and a first scan clock signal GW_CLK.

In an embodiment, each of the second gate driver 522 (or first emission driver) and the seventh gate driver 622 may generate the first emission control signal EM shown in FIG. 2, based on a first emission start signal EM_FLM and a first emission clock signal EM_CLK.

In an embodiment, each of the third gate driver 523 (or second scan driver) and the eighth gate driver 623 may generate the second scan signal GR shown in FIG. 2, based on a second scan start signal GR_FLM and a second scan clock signal GR_CLK.

In an embodiment, each of the fourth gate driver 524 (or third scan driver) and the ninth gate driver 624 may generate the third scan signal GI shown in FIG. 2, based on a third scan start signal GI_FLM and a third scan clock signal GI_CLK.

In an embodiment, each of the fifth gate driver 525 (or second emission driver) and the tenth gate driver 625 may generate the second emission control signal EMB shown in FIG. 2, based on a second emission start signal EMB_FLM and a second emission clock signal EMB_CLK.

As described above, In an embodiment, in order to drive the pixel PX shown in FIG. 2 (or the pixel PX shown in FIGS. 5, 7, and 9), the gate driver 120 may include a plurality of gate drivers (or sub-drivers).

Figure 15:
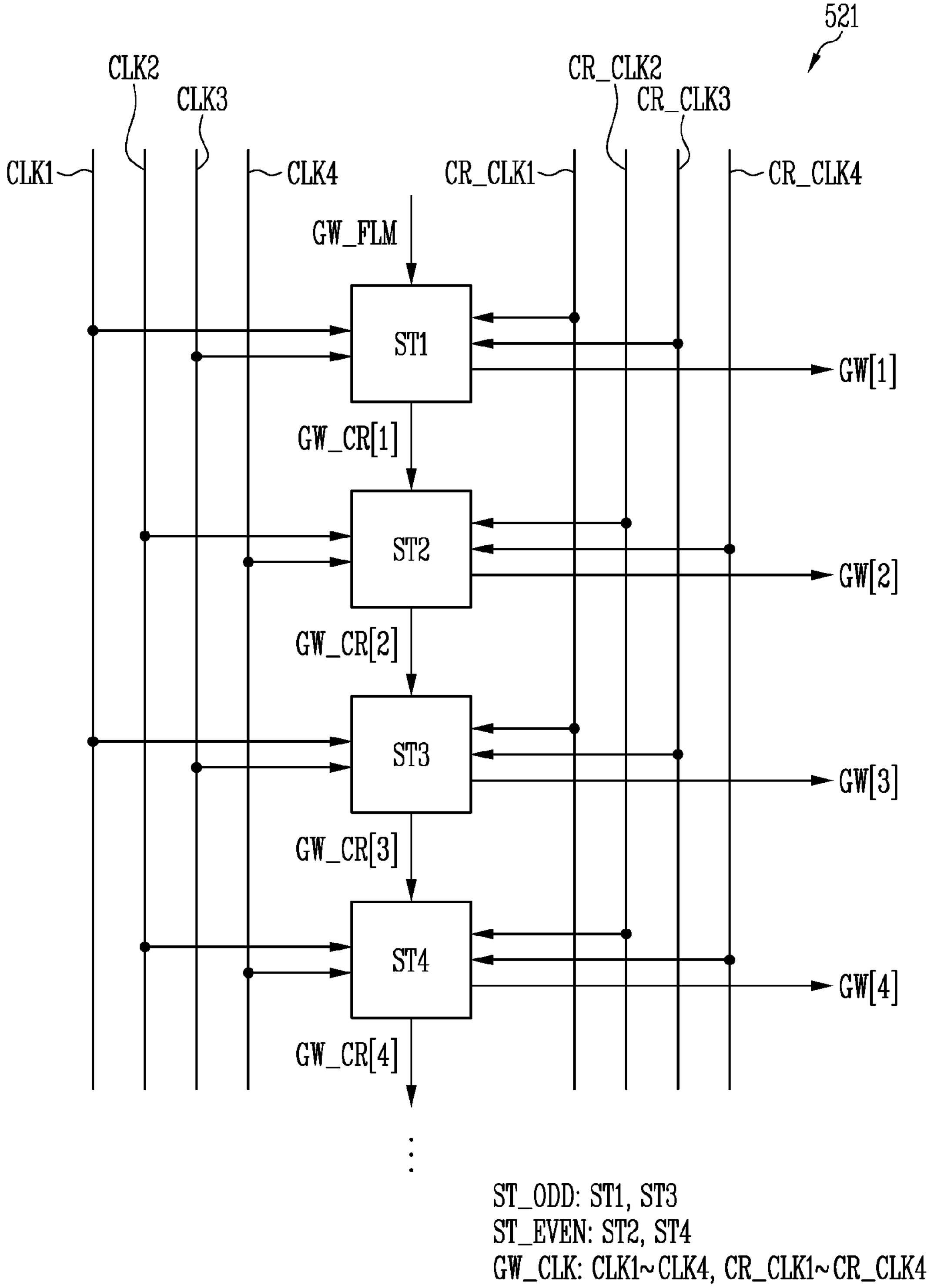
FIG. 15 is a schematic diagram illustrating an embodiment of a first gate driver included in the gate driver shown in FIG. 14.

FIG. 15 is a schematic diagram illustrating an embodiment of the first gate driver included in the gate driver shown in FIG. 14.

In an embodiment and referring to FIGS. 1, 14, and 15, the sixth gate driver 621 may be substantially identical to the first gate driver 521. Each of the other gate drivers 522 to 525 and 622 to 625 may be implemented substantially identically and/or similarly to the first gate driver 521.

In an embodiment, the first gate driver 521 may include stages ST1 to ST4. The stages ST1 to ST4 may respectively output first scan signals GW[1] to GW[4]. Each of the stages ST1 to ST4 may include at least one transistor and a capacitor, and internal circuit configurations of the stages ST1 to ST4 may be substantially identical to one another.

In an embodiment, each of the stages ST1 to ST4 may be connected to first and third clock signal lines or second and fourth clock signal lines. A first clock signal CLK1 may be applied to the first clock signal line, a second clock signal CLK2 may be applied to the second clock signal line, a third clock signal CLK3 may be applied to the third clock signal line, and a fourth clock signal CLK4 may be applied to the fourth clock signal line. Similarly to the clock signal CLK described with reference to FIG. 13, each of the first clock signal CLK1, the second clock signal CLK2, the third clock signal CLK3, and the fourth clock signal CLK4 may be a square wave which has a constant cycle and has a turn-on voltage level and/or a turn-off voltage level. The third clock signal CLK3 may have a waveform shifted by at least a half cycle from the first clock signal CLK1. The fourth clock signal CLK4 may have a waveform shifted by at least a half cycle from the second clock signal CLK2. The third clock signal CLK3 may have a waveform shifted by at least ¼ cycle from the first clock signal CLK1. For example, the first clock signal CLK1, the second clock signal CLK2, the third clock signal CLK3, and the fourth clock signal CLK4 may have waveforms respectively corresponding to the first scan signals GW[1] to GW[4] shown in FIG. 11.

Also, in an embodiment, each of the stages ST1 to ST4 may be connected to first and third carry clock signal lines or second and fourth carry clock signal lines. A first carry clock signal CR_CLK1 may be applied to the first carry clock signal line, a second carry clock signal CR_CLK2 may be applied to the second carry clock signal line, a third carry clock signal CR_CLK3 may be applied to the third carry clock signal line, and a fourth carry clock signal CR_CLK4 may be applied to the fourth carry clock signal line. The first carry clock signal CR_CLK1, the second carry clock signal CR_CLK2, the third carry clock signal CR_CLK3, and the fourth carry clock signal CR_CLK4 may have waveforms respectively corresponding to the first clock signal CLK1, the second clock signal CLK2, the third clock signal CLK3, and the fourth clock signal CLK4.

For example, in an embodiment, a first stage ST1 may receive the first and third clock signals CLK1 and CLK3, respectively, and the first and third carry clock signals CR_CLK1 and CR_CLK3, respectively. A second stage ST2 may receive the second and fourth clock signals CLK2 and CLK4, respectively, and the second and fourth carry clock signals CR_CLK2 and CR_CLK4, respectively. A third stage ST3 may receive the first and third clock signals CLK1 and CLK3, respectively, and the first and third carry clock signals CR_CLK1 and CR_CLK3, respectively. A fourth stage ST4 may receive the second and fourth clock signals CLK2 and CLK4, respectively, and the second and fourth carry clock signals CR_CLK2 and CR_CLK4, respectively. That is, an odd-numbered stage ST ODD may receive the first and third clock signals CLK1 and CLK3, respectively, and the first and third carry clock signals CR_CLK1 and CR_CLK3, respectively, and an even-numbered stage ST_EVEN may receive the second and fourth clock signals CLK2 and CLK4, respectively, and the second and fourth carry clock signals CR_CLK2 and CR_CLK4, respectively. The clock signals CLK1 to CLK4 and the carry clock signals CR_CLK1 to CR_CLK4 may be included in the first scan clock signal GW_CLK shown in FIG. 14.

In an embodiment, each of the stages ST1 to ST4 may receive a first scan start signal GW_FLM and/or a carry signal of a previous stage, and output the first scan start signal GW_FLM and/or a first scan signal (and a carry signal) corresponding to the carry signal of the previous stage, based on corresponding clock signals and/or corresponding carry clock signals among the clock signals CLK1 to CLK4 and/or the carry clock signals CR_CLK1 to CR_CLK4.

For example, in an embodiment, the first stage ST1 may output the third clock signal CLK3 as a first first scan signal GW[1] and output the third carry clock signal CR_CLK3 as a first carry signal GW_CR[1], in response to the first scan start signal GW_FLM. The second stage ST2 may output the fourth clock signal CLK4 as a second first scan signal GW[2] and output the fourth carry clock signal CR_CLK4 as a second carry signal GW_CR[2], in response to the first carry signal GW_CR[1]. The third stage ST3 may output the first clock signal CLK1 as a third first scan signal GW[3] and output the first carry clock signal CR_CLK1 as a third carry signal GW_CR[3], in response to the second carry signal GW_CR[2]. The fourth stage ST4 may output the second clock signal CLK2 as a fourth first scan signal GW[4] and output the second carry clock signal CR_CLK2 as a fourth carry signal GW_CR[4], in response to the third carry signal GW_CR[3].

In this manner, the first gate driver 521 can sequentially output the first scan signals GW[1] to GW[4] according to an embodiment.

Figure 16:
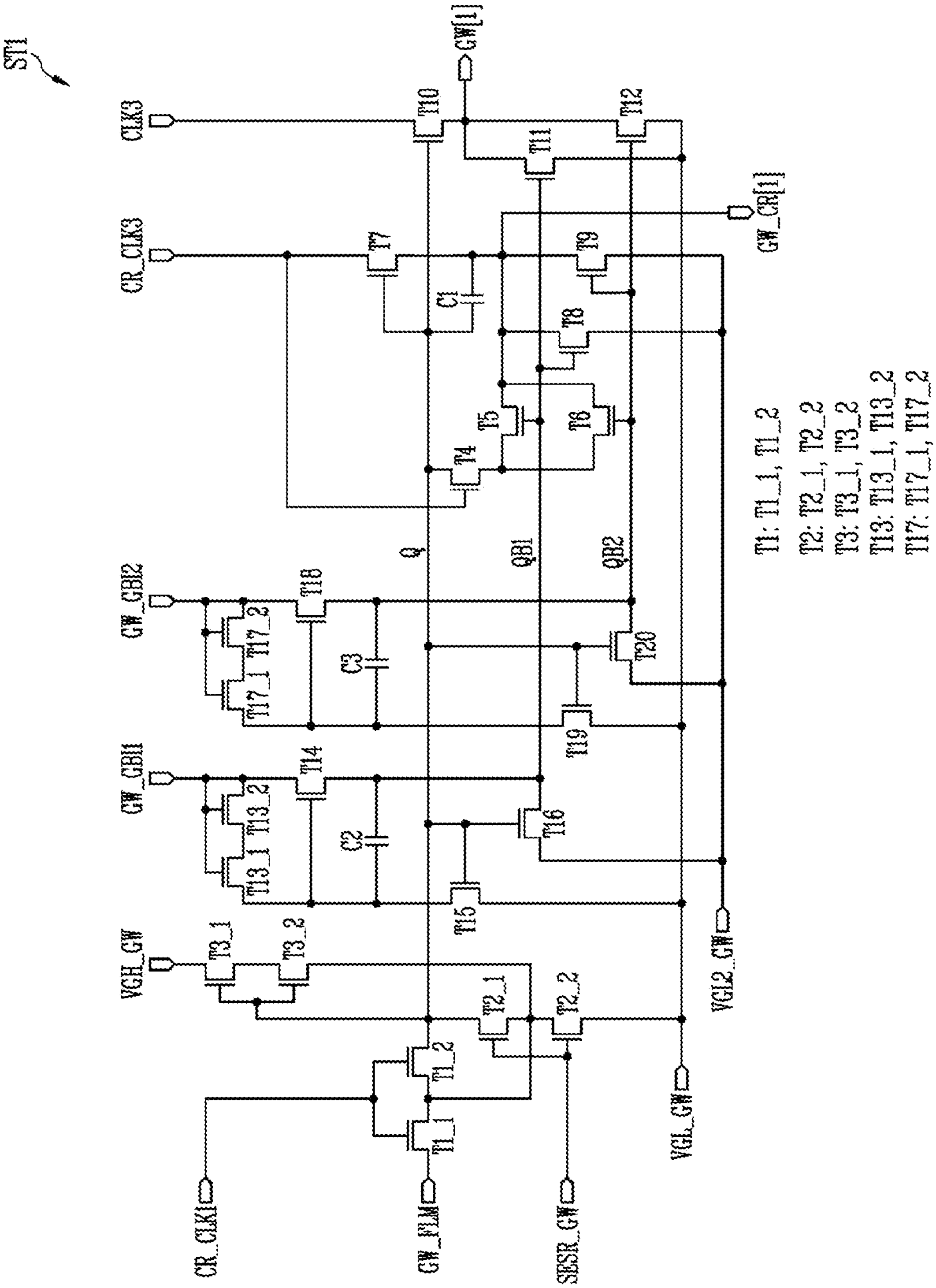
FIG. 16 is a circuit diagram illustrating an embodiment of a first stage included in the first gate driver shown in FIG. 15.

FIG. 16 is a circuit diagram illustrating an embodiment of the first stage included in the first gate driver shown in FIG. 15.

In an embodiment and referring to FIGS. 15 and 16, the first stage ST1 may include transistors T1 to T20 and capacitors C1 to C3. A connection configuration of the transistors T1 to T20 and the capacitors C1 to C3 is the same as shown in FIG. 16.

In an embodiment, a first transistor T1 may be electrically connected between a terminal to which the first scan start signal GW_FLM is applied and a first control node Q. Agate electrode of the first transistor T1 may be connected to a terminal to which the first carry clock signal CR_CLK1 is applied. The first transistor T1 may be turned on in response to the first carry clock signal CR_CLK1 having the turn-on voltage level, and transfer the first scan start signal GW_FLM to the first control node Q.

In an embodiment, the first transistor T1 may include a first sub-transistor T1_1 and a second sub-transistor T1_2, which are connected in series between the terminal to which the first scan start signal GW_FLM is applied and the first control node Q.

In an embodiment, a second transistor T2 may be electrically connected between a terminal to which the first low-power voltage VGL_GW is applied and the first control node Q. The first low-power voltage VGL_GW may have the turn-off voltage level. A gate electrode of the second transistor T2 may be connected to a terminal to which a control signal SESR_GW is applied. The second transistor T2 may be turned on in response to the control signal SESR_GW having the turn-on voltage level, and transfer the first low-power voltage VGL_GW to the first control node Q.

In an embodiment, the second transistor T2 may include a third sub-transistor T2_1 and a fourth sub-transistor T2_2, which are connected in series between the terminal to which the first low-power voltage VGL_GW is applied and the first control node Q. The first sub-transistor T1_1 and the second sub-transistor T1_2 may be connected to an intermediate node at which the third sub-transistor T2_1 and the fourth sub-transistor T2_2 are connected to each other.

In an embodiment, a third transistor T3 may be electrically connected between a terminal to which a high-power voltage VGH_GW is applied and the intermediate node (i.e., a node at which the third sub-transistor T2_1 and the fourth sub-transistor T2_2 are connected to each other). The high-power voltage VGH_GW may have the turn-on voltage level. A gate electrode of the third transistor T3 may be connected to the first control node Q and when a voltage of the first control node Q has the turn-on voltage level, the third transistor T3 may be turned on, and transfer the high-power voltage VGH_GW to the intermediate node.

According to an operation of the third transistor T3, the inter-source-drain stress of the first and second transistors T1 and T2 is decreased, and the first and second transistors T1 and T2 can be more stably operated.

In an embodiment, the third transistor T3 may include a fifth sub-transistor T3_1 and a sixth sub-transistor T32, which are connected in series between the terminal to which a high-power voltage VGH_GW is applied and the intermediate node.

In an embodiment, a fourth transistor T4 and a fifth transistor T5 may be electrically connected between the first control node Q and a carry output terminal (i.e., an output terminal from which the first carry signal GW_CR[1] is output). A gate electrode of the fourth transistor T4 may be connected to a terminal to which the third carry clock signal CR_CLK3 is applied, and a gate electrode of the fifth transistor T5 may be connected to a second control node QB1. A sixth transistor T6 may be connected in parallel to the fifth transistor T5. A gate electrode of the sixth transistor T6 may be connected to a third control node QB2. The fourth transistor T4 may be turned on in response to the third carry clock signal CR_CLK3 having the turn-on voltage level, the fifth transistor T5 may be turned on when the second control node QB1 has the turn-on voltage level, the sixth transistor T6 may be turned on when the third control node QB2 has the turn-on voltage level, and the first control node Q may be maintained with the first carry signal GW_CR[1](or the first carry signal GW_CR[1] having the turn-off voltage level).

In an embodiment, a seventh transistor T7 may be electrically connected between the terminal to which the third carry clock signal CR_CLK3 is applied and the carry output terminal. A gate electrode of the seventh transistor T7 may be electrically connected to the first control node Q. The seventh transistor T7 may be turned on when the first control node Q has the turn-on voltage level, and output the third carry clock signal CR_CLK3 as the first carry signal GW_CR[1].

In an embodiment, a first capacitor C1 may be electrically connected between the first control node Q and the carry output terminal. When the first carry signal GW_CR[1] having the turn-on voltage level is output, the first capacitor C1 may boost the voltage of the first control node Q.

In an embodiment, an eighth transistor T8 may be electrically connected between a terminal to which a second low-power voltage VGL2_GW is applied and the carry output terminal. The second low-power voltage VGL2_GW may have the turn-off voltage level or a voltage level corresponding thereto. The voltage level of the second low-power voltage VGL2_GW may be lower than or equal to the voltage level of the first low-power voltage VGL_GW, but the disclosure is not limited thereto. A gate electrode of the eighth transistor T8 may be electrically connected to the second control node QB1. The eighth transistor T8 may be turned on when the second control node QB1 has the turn-on voltage level, and pull down the first carry signal GW_CR [1] to the second low-power voltage VGL2_GW.

In an embodiment, a ninth transistor T9 may be connected in parallel to the eighth transistor T8. The ninth transistor T9 may be electrically connected between the terminal to which a second low-power voltage VGL2_GW is applied and the carry output terminal. A gate electrode of the ninth transistor T9 may be electrically connected to the third control node QB2. The ninth transistor T9 may be turned on when the third control node QB2 has the turn-on voltage level, and pull down the first carry signal GW_CR[1] to the second low-power voltage VGL2_GW.

In an embodiment, a tenth transistor T10 may be electrically connected between a terminal to which the third clock signal CLK3 is applied and a scan output terminal (i.e., an output terminal from which the first first scan signal GW[1] is output). A gate electrode of the tenth transistor T10 may be electrically connected to the first control node Q. The tenth transistor T10 may be turned on when the first control node Q has the turn-on voltage level, and output the third clock signal CLK3 as the first first scan signal GW[1].

In an embodiment, an eleventh transistor T11 may be electrically connected between the terminal to which the first low-power voltage VGL_GW is applied and the scan output terminal. A gate electrode of the eleventh transistor T11 may be electrically connected to the second control node QB1. The eleventh transistor T11 may be turned on when the second control node QB1 has the turn-on voltage level, and pull down the first first scan signal GW[1] to the first low-power voltage VGL_GW.

In an embodiment, a twelfth transistor T12 may be connected in parallel to the eleventh transistor T11. The twelfth transistor T12 may be electrically connected between the terminal to which the first low-power voltage VGL_GW is applied and the scan output terminal. A gate electrode of the twelfth transistor T12 may be electrically connected to the third control node QB2. The twelfth transistor T12 may be turned on when the third control node QB2 has the turn-on voltage level, and pull down the first first scan signal GW[1] to the first low-power voltage VGL_GW.

In an embodiment, a thirteenth transistor T13 may be electrically connected between a terminal to which a first switching signal GW_GBI1 is applied and a gate electrode of a fourteenth transistor T14. A gate electrode of the thirteenth transistor T13 may be connected to the terminal to which the first switching signal GW_GBI1 is applied. The thirteenth transistor T13 may be turned on in response to the first switching signal GW_GBI1 having the turn-on voltage level, and transfer the first switching signal GW_GBI1 having the turn-on voltage level to the gate electrode of the fourteenth transistor T14.

In an embodiment, the thirteenth transistor T13 may include a seventh sub-transistor T13_1 and an eighth sub-transistor T13_2, which are connected in series between the terminal to which the first switching signal GW_GBI1 is applied and the gate electrode of the fourteenth transistor T14.

In an embodiment, the fourteenth transistor T14 may be electrically connected between the terminal to which the first switching signal GW_GBI1 is applied and the second control node QB1. The fourteenth transistor T14 may be turned on in response to the first switching signal GW_GBI1 having the turn-on voltage level, and transfer the first switching signal GW_GBI1 having the turn-on voltage level to the second control node QB1. A second capacitor C2 may be electrically connected between the gate electrode of the fourteenth transistor T14 and the second control node QB1. A function of the second capacitor C2 may be similar to a function of the first capacitor C1.

In an embodiment, a fifteenth transistor T15 may be electrically connected between the gate electrode of the fourteenth transistor T14 and the terminal to which the first low-power voltage VGL_GW is applied. Agate electrode of the fifteenth transistor T15 may be connected to the first control node Q. The fifteenth transistor T15 may be turned on when the first control node Q has the turn-on voltage level, and transfer the first low-power voltage VGL_GW to the gate electrode of the fourteenth transistor T14.

In an embodiment, a sixteenth transistor T16 may be electrically connected between the second control node QB1 and the terminal to which the second low-power voltage VGL2_GW is applied. A gate electrode of the sixteenth transistor T16 may be connected to the first control node Q. The sixteenth transistor T16 may be turned on when the first control node Q has the turn-on voltage level, and transfer the second low-power voltage VGL2_GW to the second control node QB1.

That is, in an embodiment, when the first control node Q has the turn-on voltage level, the fifteenth transistor T15 and/or the sixteenth transistor T16 may maintain the second control node QB1 at the turn-off voltage level.

In an embodiment, a seventeenth transistor T17 may be electrically connected between a terminal to which a second switching signal GW_GBI2 is applied and a gate electrode of an eighteenth transistor T18. Agate electrode of the seventeenth transistor T17 may be connected to the terminal to which the second switching signal GW_GBI2 is applied. The seventeenth transistor T17 may be turned on in response to the second switching signal GW_GBI2 having the turn-on voltage level, and transfer the second switching signal GW_GBI2 having the turn-on voltage level to the gate electrode of the eighteenth transistor T18.

In an embodiment, the seventeenth transistor T17 may include a ninth sub-transistor T17_1 and a tenth sub-transistor T17_2, which are connected in series between the terminal to which the second switching signal GW_GBI2 is applied and the gate electrode of the eighteenth transistor T18.

In an embodiment, the eighteenth transistor T18 may be electrically connected between the terminal to which the second switching signal GW_GBI2 is applied and the third control node QB2. The eighteenth transistor T18 may be turned on in response to the second switching signal GW_GBI2 having the turn-on voltage level, and transfer the second switching signal GW_GBI2 having the turn-on voltage level to the third control node QB2. A third capacitor C3 may be electrically connected between the gate electrode of the eighteenth transistor T18 and the third control node QB2.

In an embodiment, the nineteenth transistor T19 may be electrically connected between the gate electrode of the eighteenth transistor T18 and the terminal to which the first low-power voltage VGL_GW is applied. A gate electrode of the nineteenth transistor T19 may be connected to the first control node Q. The nineteenth transistor T19 may be turned on when the first control node Q has the turn-on voltage level, and transfer the first low-power voltage VGL_GW to the gate electrode of the eighteenth transistor T18.

In an embodiment, the twentieth transistor T20 may be electrically connected between the third control node QB2 and the terminal to which the second low-power voltage VGL2_GW is applied. A gate electrode of the twentieth transistor T20 may be connected to the first control node Q. The twentieth transistor T20 may be turned on when the first control node Q has the turn-on voltage level, and transfer the second low-power voltage VGL2_GW to the third control node QB2.

That is, in an embodiment, when the first control node Q has the turn-on voltage level, the nineteenth transistor T19 and/or the twentieth transistor T20 may maintain the third control node QB2 at the turn-off voltage level.

In an embodiment, the first switching signal GW_GBI1 and/or the second switching signal GW_GBI2 may have different voltage levels, and be changed using two frame periods as a cycle. Each of the first switching signal GW_GBI1 and the second switching signal GW_GBI2 may have the turn-on voltage level during one frame period, and have the turn-off voltage level during another frame period. For example, in a first frame period, the first switching signal GW_GBI1 may have the turn-on voltage level and the second switching signal GW_GBI2 may have the turn-off voltage level. In a second frame period, the first switching signal GW_GBI1 may have the turn-off voltage level and the second switching signal GW_GBI2 may have the turn-on voltage level. Accordingly, the second control node QB1 and the third control node QB2 alternately have the turn-on voltage level in units of frame periods, and transistors (e.g., T5, T6, T8, T9, T11, T12, and the like) connected to the second control node QB1 and the third control node QB2 are alternately operated in units of frame periods, so that stress of the transistors can be reduced.

In the display device in accordance with the disclosure, scan signals may be sequentially output to pixels while partially overlapping with each other, and a data signal may be provided to a corresponding pixel in a period in which a corresponding scan signal does not overlap with a previous scan signal. One horizontal time as an interval between the scan signals may be set by considering only a writing time of the data signal and/or a falling time of the scan signals, without considering a setting time (or change time) of the data signal and/or a rising time of the scan signals. Thus, the one horizontal time can be decreased, and the high-frequency driving of the display device can be performed.

In addition, in an embodiment, pixels included in one pixel column may be alternately connected to two or more data lines. The writing time of a data signal may be set to two horizontal times or more. Thus, the writing time of the data signal can be more sufficiently secured, and/or the high-frequency driving of the display device can be performed.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

The embodiments disclosed and illustrated in the drawings are provided as particular examples for more easily explaining the technical contents according to the disclosure and helping understand the embodiments of the disclosure, but not intended to limit the scope of the embodiments. Accordingly, the scope of the various embodiments of the present disclosure should be interpreted to include, in addition to the embodiments disclosed herein, all alterations or modifications derived from the technical ideas of the various embodiments of the present disclosure. Moreover, the embodiments or parts of the embodiments may be combined in whole or in part without departing from the scope of the invention.

What is claimed is:

1. A display device comprising:

a display panel including pixels in one pixel column; and a gate driver configured to sequentially provide scan signals to the pixels, wherein each of the pixels includes:

a light emitting element;

a first transistor configured to control a current amount of driving current flowing through the light emitting element; and a second transistor configured to transfer a data signal from one of a first data line or a second data line to a gate electrode of the first transistor in response to a corresponding scan signal among the scan signals;

a third transistor electrically connected between a reference power line and the gate electrode of the first transistor;

a fourth transistor electrically connected between an anode electrode of the light emitting element and a second initialization power line;

a fifth transistor electrically connected between a first power line and a first electrode of the first transistor;

a sixth transistor electrically connected between a second electrode of the first transistor and the anode electrode of the light emitting element;

a seventh transistor electrically connected between a second capacitor and a third power line;

a first capacitor electrically connected between the gate electrode and the second electrode of the first transistor; and the second capacitor electrically connected between the second electrode of the first transistor and the seventh transistor, wherein the pixels in the one column are alternately connected to the first data line and the second data line along an extension direction of the first and second data lines, wherein the second transistor is connected directly between the one of the first data line or the second data line and the gate electrode of the first transistor and includes a gate electrode connected to a first scan line to receive a first scan signal, wherein a first pixel among the pixels is electrically connected to the first data line, and the second pixel adjacent to the first pixel among the pixels is electrically connected to the second data line different from the first data line, and wherein a second scan signal is provided to the second pixel and partially overlaps with the first scan signal provided to the first pixel.

2. The display device of claim 1, wherein the gate driver sequentially provides the scan signals to the pixels at an interval of one horizontal time, and wherein a pulse width of the second scan signal is greater than the one horizontal time.

3. The display device of claim 2, wherein the pulse width of the second scan signal is about three horizontal times.

4. The display device of claim 2, wherein the pulse width of the second scan signal is about two horizontal times.

5. The display device of claim 1, wherein, in a period in which the second scan signal does not overlap with the first scan signal, a data signal for the second pixel is applied to the second data line.

6. The display device of claim 1, wherein the first transistor further includes a second gate electrode electrically connected to the second electrode of the first transistor.

7. The display device of claim 1, wherein each of the first transistor and the second transistor includes an oxide semiconductor.

8. The display device of claim 1, wherein the pixels includes odd-numbered pixels and even-numbered pixels and wherein the odd-numbered pixels among the pixels are electrically connected to the first data line, and the even-numbered pixels among the pixels are electrically connected to the second data line.

9. A display device comprising:

a display panel including pixels in one pixel column; and a gate driver configured to sequentially provide scan signals to the pixels at an interval of one horizontal time, wherein each of the pixels includes:

a light emitting element;

a first transistor configured to control a current amount of driving current flowing through the light emitting element; and a second transistor configured to transfer a data signal from one of a first data line or a second data line to a gate electrode of the first transistor in response to a corresponding scan signal among the scan signals;

a third transistor electrically connected between a reference power line and the gate electrode of the first transistor;

a fourth transistor electrically connected between an anode electrode of the light emitting element and a second initialization power line;

a fifth transistor electrically connected between a first power line and a first electrode of the first transistor;

a sixth transistor electrically connected between a second electrode of the first transistor and the anode electrode of the light emitting element;

a seventh transistor electrically connected between a second capacitor and a third power line;

a first capacitor electrically connected between the gate electrode and the second electrode of the first transistor; and the second capacitor electrically connected between the second electrode of the first transistor and the seventh transistor, wherein the pixels in the one column are alternately connected to the first data line and the second data line along an extension direction of the first and second data lines, wherein the second transistor is connected directly between the one of the first data line or the second data line and the gate electrode of the first transistor and includes a gate electrode connected to a scan line to receive the scan signals, wherein a first pixel among the pixels is electrically connected to the first data line, and a second pixel adjacent to the first pixel among the pixels is electrically connected to the second data line different from the first data line, and wherein a pulse width of each of the scan signals is greater than or equal to two horizontal times.

10. The display device of claim 9, wherein the pulse width of each of the scan signals is about three horizontal times.

11. The display device of claim 9, wherein the first transistor further includes a second gate electrode electrically connected to the second electrode of the first transistor.

12. The display device of claim 9, wherein each of the first transistor and the second transistor includes an oxide semiconductor.

* * * * *